United States Patent
Bishnoi et al.

(10) Patent No.: US 12,282,969 B2
(45) Date of Patent: Apr. 22, 2025

(54) INSIGHTS SYSTEM

(71) Applicant: American Express Travel Related Services Company, Inc., New York, NY (US)

(72) Inventors: Richa Bishnoi, Gurgaon (IN); Bobby Chetal, Gurgaon (IN); Priyesha Jain, Gurgaon (IN); Vishal Jain, Gurgaon (IN); Isha Kakkar, Noida (IN); Ashi Sawhney, Gurgaon (IN); Preetika Madan, New Delhi (IN); Mayank Pruthi, Najafgarh (IN); Rahul Sharma, New Delhi (IN); Madhu Setia, Gurgaon (IN); Yakshi Shode, New Delhi (IN); Kartikeya Singh, Gurgaon (IN); Vivek Singh, Delhi (IN); Annamalai Veerappan, Gurgaon (IN)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 112 days.

(21) Appl. No.: 17/712,736

(22) Filed: Apr. 4, 2022

(65) Prior Publication Data
US 2023/0316419 A1 Oct. 5, 2023

Related U.S. Application Data

(63) Continuation of application No. 15/988,770, filed on May 24, 2018, now abandoned.

(51) Int. Cl.
*G06Q 40/12* (2023.01)

(52) U.S. Cl.
CPC .................................. *G06Q 40/12* (2013.12)

(58) Field of Classification Search
None
See application file for complete search history.

(56) References Cited

U.S. PATENT DOCUMENTS

| 8,712,811 B2 | 4/2014 | Fredericks et al. |
| 2003/0014399 A1* | 1/2003 | Hansen ................. G06F 16/951 |
| 2007/0203814 A1* | 8/2007 | Di Florio ............... G06Q 40/02 705/30 |
| 2009/0192867 A1* | 7/2009 | Farooq ............... G06Q 30/0201 705/7.29 |

(Continued)

*Primary Examiner* — Fateh M Obaid
(74) *Attorney, Agent, or Firm* — Thomas Horstemeyer, LLP

(57) ABSTRACT

Systems and methods are disclosed for generating interactive user interfaces for evaluating transactions of an organization. For example, a system can be configured to receive transactions for an organization and determine a first subset of the transactions during a trip at a first location that is different from a home location of a consumer. A respective transaction associated with a second location that occurred during the trip is identified. The respective transaction is assigned to the first subset of the of transactions for the trip. A second subset of the transactions of a spending type is determined. A parameter value associated with the spending type is identified. A parameter adjustment is determined. The system is configured to cause a display of a spending type user interface on a client device and receive a selection of a parameter component.

20 Claims, 8 Drawing Sheets

(56) References Cited

U.S. PATENT DOCUMENTS

| | | | |
|---|---|---|---|
| 2009/0240568 A1* | 9/2009 | Ramer | G06F 16/68 705/35 |
| 2009/0240569 A1* | 9/2009 | Ramer | G06F 16/9577 707/999.01 |
| 2010/0082431 A1* | 4/2010 | Ramer | G06Q 30/02 707/E17.109 |
| 2010/0094878 A1* | 4/2010 | Soroca | G06Q 30/0267 707/812 |
| 2011/0251901 A1 | 10/2011 | Kwon et al. | |
| 2013/0132214 A1* | 5/2013 | Hulett | G06Q 30/00 705/15 |
| 2013/0173493 A1* | 7/2013 | Chowdhary | G06Q 40/06 705/36 R |
| 2014/0006067 A1* | 1/2014 | Rothley | G06Q 10/06 705/5 |
| 2014/0019352 A1* | 1/2014 | Shrivastava | G06Q 20/326 705/41 |
| 2014/0136259 A1* | 5/2014 | Kinsey, II | G06Q 30/0631 705/7.16 |
| 2015/0046271 A1* | 2/2015 | Scholl | G06Q 20/202 705/15 |
| 2015/0073952 A1* | 3/2015 | Ventura | G06Q 40/12 705/30 |
| 2015/0375104 A1* | 12/2015 | Nishar | A63F 13/65 463/9 |
| 2016/0132828 A1* | 5/2016 | Hartung | G06Q 10/103 705/7.39 |
| 2016/0171557 A1* | 6/2016 | Fanous | G06Q 50/01 705/14.66 |
| 2018/0075391 A1* | 3/2018 | Chung | G06Q 40/125 |
| 2018/0137577 A1* | 5/2018 | Niderberg | G06Q 20/322 |
| 2018/0350144 A1* | 12/2018 | Rathod | G06Q 20/3224 |
| 2019/0287183 A1* | 9/2019 | Bishnoi | G06F 40/205 |
| 2021/0035140 A1* | 2/2021 | Fuzayloff | G06F 40/40 |

* cited by examiner

INSIGHTS SYSTEM

CROSS-REFERENCE TO RELATED APPLICATIONS

This application is a continuation of, and claims priority to, co-pending U.S. Patent Application entitled "INSIGHTS SYSTEM," filed on May 24, 2018, and assigned application Ser. No. 15/988,770, which is incorporated herein by reference in its entirety.

FIELD

The present disclosure generally relates to evaluating transactional behavior of a consumer, and the effect of such transactional behavior on total money spent, to optimize cost savings.

BACKGROUND

Companies often have spending policies or rules dictating to employees what types of transactions they may conduct (or when they may conduct transactions) with company funds (or for which they may seek reimbursement, e.g., for travel and entertainment). The types of transactions allowed may be from a certain merchant, from a certain merchant type (e.g., a restaurant, movie theater, grocery store, etc.), for a certain amount (e.g., a daily dollar limit, meal limit, etc.), on a certain day, at a certain time of day, or the like. Employees are expected to follow the rules of the spending policy in order to appropriately and efficiently utilize a company's financial resources.

However, it may be difficult to detect noncompliant spending of company money (e.g., the conducting of transactions that are noncompliant with company rules), and difficult to determine the savings effect to a company that would result from a change in company spending policy and/or employee spending behavior.

SUMMARY

A system, method, and article of manufacture (collectively, "the system") are disclosed relating to an insights system. In various embodiments, the system may be configured to perform operations including receiving, by a processor, a transaction history for a consumer having transaction information associated with a plurality of transactions; parsing, by the processor, transactions of the plurality of transactions into a plurality of spending types based on metadata in the transaction information indicating a spending type; identifying, by the processor, a first spending type of a first transaction of the plurality of transactions based on associated metadata, wherein the first spending type is related to a travel expense, wherein the first spending type is from the plurality of spending types; identifying, by the processor, based on the metadata, a first parameter associated with the first spending type in the transaction information of the first transaction; determining, by the processor, a first parameter value of the first parameter; determining, by the processor, a first parameter benchmark value associated with the first parameter; comparing, by the processor, the first parameter value to the first parameter benchmark value to determine a first parameter value difference; determining, by the processor, a first parameter adjustment recommendation in response to the first parameter value unfavorably differing from the first parameter benchmark value; and/or displaying, by the processor, the first parameter adjustment recommendation on a display screen.

In various embodiments, the operations may further comprise determining, by the processor, a first transaction cost associated with the first transaction; comparing, by the processor, the first transaction cost with a first spending type benchmark cost; calculating, by the processor, a first cost difference between the first transaction cost and the first spending type benchmark cost, wherein the first parameter adjustment recommendation is configured to decrease the first cost difference in response to the first cost difference being an unfavorable difference; calculating, by the processor, a first portion of the first cost difference attributed to the first parameter value difference; and/or determining, by the processor, a first savings amount associated with implementation of the first parameter adjustment recommendation.

In various embodiments, determining the first transaction cost may comprise determining a first total cost amount and dividing it by a base unit amount such that the first transaction cost is a first monetary amount per base unit, and wherein the first spending type benchmark cost is a benchmark monetary amount per base unit. In various embodiments, calculating the first portion of the first cost difference attributed to the first parameter value difference may comprise assigning, by the processor, a first parameter weight to the first parameter; and/or applying, by the processor, the first parameter weight to the first cost difference. In various embodiments, the first parameter adjustment recommendation may comprise a first adjustment amount by which to adjust the first parameter value.

In various embodiments, the operations may further comprise identifying, by the processor, a second parameter associated with the first spending type in the transaction information of the first transaction; determining, by the processor, a second parameter value of the second parameter; determining, by the processor, a second parameter benchmark value associated with the second parameter; comparing, by the processor, the second parameter value to the second parameter benchmark value; calculating, by the processor, a second parameter value difference between the second parameter value and the second parameter benchmark value; and/or determining, by the processor, a second parameter adjustment recommendation in response to the second parameter value unfavorably differing from the second parameter benchmark value. In various embodiments, the operations may further comprise determining, by the processor, a second savings amount associated with implementation of the second parameter adjustment recommendation. In various embodiments, the second parameter adjustment recommendation comprises a second adjustment amount by which to adjust the second parameter value.

In various embodiments, the operations may further comprise identifying, by the processor, the first spending type of a group of transactions of the plurality of transactions, wherein the first transaction is in the group of the transactions, wherein each of the group of transactions comprises the first parameter; calculating, by the processor, a spending type monetary cost, wherein the spending type monetary cost is a group average monetary amount per base unit; comparing, by the processor, the spending type monetary cost to a group spending type benchmark cost, which is a benchmark monetary amount per base unit; calculating, by the processor, a group cost difference between the spending type monetary cost and the first spending type benchmark cost; determining, by the processor, a first group parameter value of the first parameter; comparing, by the processor, the first group parameter value to the first parameter benchmark value; and/or determining, by the processor, a first group parameter adjustment recommendation in response to the first group parameter value unfavorably differing from the first parameter benchmark value, wherein the first group parameter adjustment recommendation is configured to decrease the group cost difference in response to the group cost difference being an unfavorable difference. In various embodiments, the first parameter may be at least one of an advance booking, a trip duration, or an ancillary fee amount. In various embodiments, the operations may further comprise determining, by the processor, a business trip duration by determining, by the processor, a first day of a business trip and a last day of the business trip, wherein the first day of the business trip is determined by identifying a geographic location change in the transaction information associated with a pair of consecutive transactions in the transaction history, wherein the pair of consecutive transactions comprises a respective pair of geographic locations having a distance between the pair of geographic locations of greater than a predetermined travel distance, and wherein the first transaction is a transaction conducted during the business trip.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

The detailed description of various embodiments makes reference to the accompanying drawings, which show the exemplary embodiments by way of illustration. While these exemplary embodiments are described in sufficient detail to enable those skilled in the art to practice the disclosure, it should be understood that other embodiments may be realized and that logical and mechanical changes may be made without departing from the spirit and scope of the disclosure. Thus, the detailed description is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Figure 1:
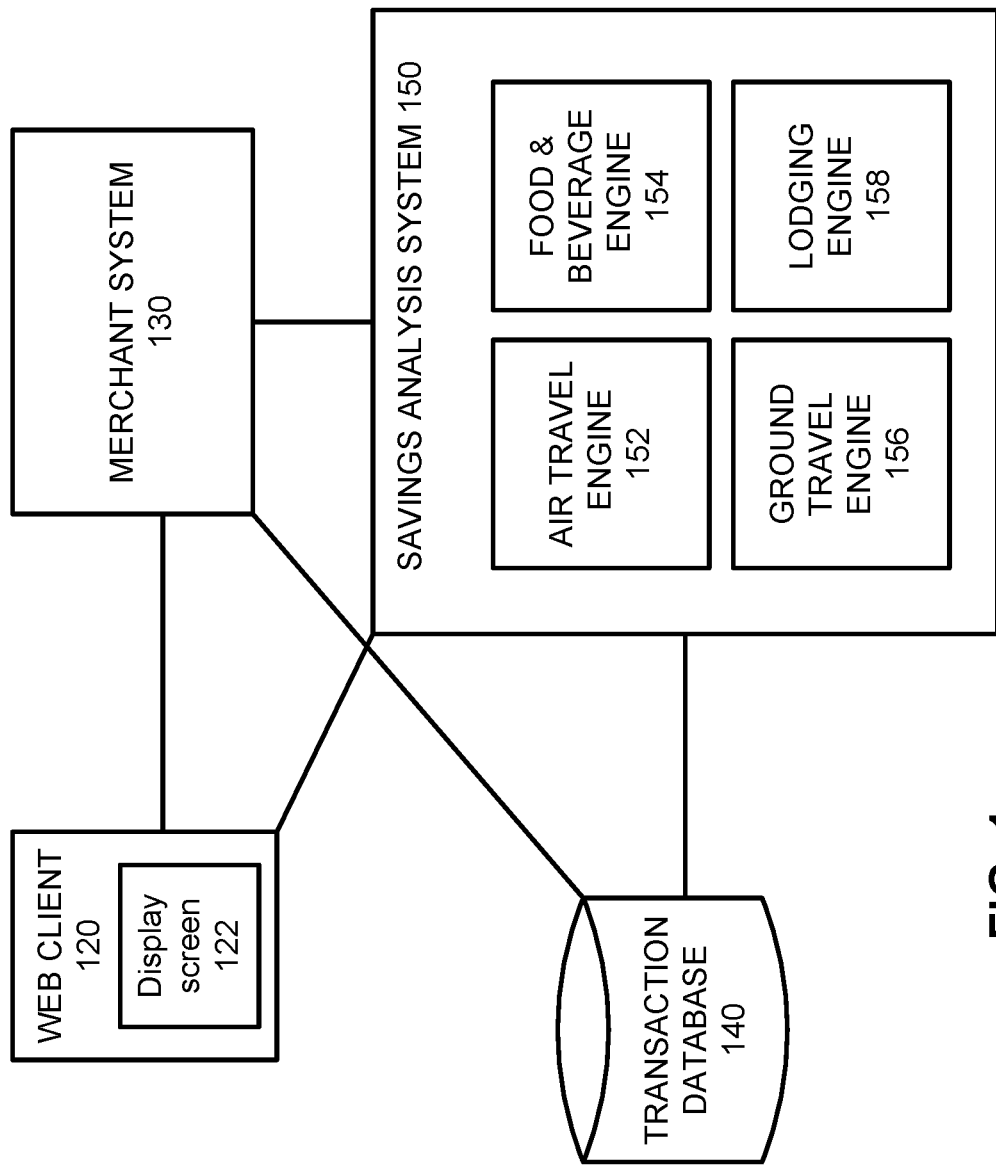
FIG. 1 depicts an exemplary insights system, in accordance with various embodiments.

With reference to FIG. 1, an exemplary insights system 100 is disclosed. In various embodiments, system 100 may comprise a web client 120, a merchant system 130, a transaction database 140, and/or a insights analysis system 150. All or any subset of components of system 100 may be in communication with one another via a network. System 100, or any components comprised therein, may be computer-based, and may comprise a processor, a tangible non-transitory computer-readable memory, and/or a network interface. Instructions stored on the tangible non-transitory memory may allow system 100 to perform various functions, as described herein.

In various embodiments, web client 120 may incorporate hardware and/or software components. For example, web client 120 may comprise a server appliance running a suitable server operating system (e.g., MICROSOFT INTERNET INFORMATION SERVICES or, "IIS"). Web client 120 may be any device that allows a user to communicate with a network (e.g., a personal computer, personal digital assistant (e.g., IPHONE®, BLACKBERRY®), cellular phone, kiosk, and/or the like). Web client 120 may be in communication with merchant system 130 and/or insights analysis system 150 via a network. Web client 120 may participate in any or all of the functions performed by merchant system 130 and/or insights analysis system 150 via the network.

Web client 120 includes any device (e.g., personal computer) which communicates via any network, such as those discussed herein. In various embodiments, web client 120 may comprise and/or run a browser, such as MICROSOFT® INTERNET EXPLORER®, MOZILLA® FIREFOX®, GOOGLE® CHROME®, APPLE® Safari, or any other of the myriad software packages available for browsing the internet. For example, the browser may communicate with merchant system 130 via network by using Internet browsing software installed in the browser. The browser may comprise Internet browsing software installed within a computing unit or a system to conduct online transactions and/or communications. These computing units or systems may take the form of a computer or set of computers, although other types of computing units or systems may be used, including laptops, notebooks, tablets, handheld computers, personal digital assistants, set-top boxes, workstations, computer-servers, main frame computers, mini-computers, PC servers, pervasive computers, network sets of computers, personal computers, such as IPADS®, IMACS®, and MACBOOKS®, kiosks, terminals, point of sale (POS) devices and/or terminals, televisions, or any other device capable of receiving data over a network. In various embodiments, the browser may be configured to display an electronic channel.

In various embodiments, a network may be an open network or a closed loop network. The open network may be a network that is accessible by various third parties. In this regard, the open network may be the internet, a typical transaction network, and/or the like. Network may also be a closed network. In this regard, network may be a closed loop network like the network operated by American Express. Moreover, the closed loop network may be configured with enhanced security and monitoring capability. For example, the closed network may be configured with tokenization, associated domain controls, and/or other enhanced security protocols. In this regard, network may be configured to monitor users on the network. In this regard, the closed loop network may be a secure network and may be an environment that can be monitored, having enhanced security features.

In various embodiments, merchant system 130 may be associated with a merchant, and may incorporate hardware and/or software components. For example, merchant system 130 may comprise a server appliance running a suitable server operating system (e.g., Microsoft Internet Information Services or, "IIS"). Merchant system 130 may be in communication with web client 120, transaction database 140, and/or insights analysis system 150. In various embodiments, merchant system 130 may comprise an online store, which consumers may access through the browser on web client 120 to purchase goods or services from the merchant.

In various embodiments, transaction database 140 may be associated with a transaction account issuer (an entity that issues transaction accounts to consumers, such as credit cards, bank accounts, etc.). Transaction database 140 may comprise hardware and/or software capable of storing data and/or analyzing information. Transaction database 140 may comprise a server appliance running a suitable server operating system (e.g., MICROSOFT INTERNET INFORMATION SERVICES or, "IIS") and having database software (e.g., ORACLE) installed thereon. Transaction database 140 may be in electronic communication with merchant system 130 and/or insights analysis system 150. In various embodiments, transaction database 140 may comprise software and hardware configured to receive and store transaction information from transactions completed between at least two parties (e.g., merchants and consumers). Transaction information may include details and/or characteristics (i.e., parameters) of the associated transaction(s), such as a transaction location, merchant identification and information, specified industry and/or merchant category, merchant type (e.g., providing a certain good or service within an industry or merchant category), item purchased, monetary amount, date, time, credit payment time/amount, etc. The consumers involved in the transactions may hold transaction accounts issued from the transaction account issuer that is associated with system 100 and/or insights analysis system 150.

In various embodiments, consumers (i.e., employees of companies) may engage in transactions with merchant system 130 (representing multiple merchants with which the consumer may transact). Transaction information associated with each transaction may be transmitted to transaction database 140 for storage. There may be a plurality of transactions and associated transaction information.

In various embodiments, insights analysis system 150 may comprise hardware and/or software capable of storing data and/or analyzing information. Insights analysis system 150 may comprise a processor and server appliance running a suitable server operating system (e.g., MICROSOFT INTERNET INFORMATION SERVICES or, "IIS") and having database software (e.g., ORACLE) installed thereon. Insights analysis system 150 may be in electronic communication with web client 120, merchant system 130, and/or transaction database 140. In various embodiments, insights analysis system 150 may comprise various engines to analyze transactions having various spending types (e.g., spending associated with travel expenses, such as for air travel, ground travel, lodging, and/or the like, and in various embodiments, related entertainment expenses such as food and beverage) and transaction information associated therewith. The various engines may be configured to create insights, and determine whether parameters associated with the transactions of each spending type are at a level or value that is optimizing the company's financial resource use. Similarly, the various engines of insights analysis system 150 may be configured to recommend adjustments to spending type parameters and parameter values, and calculate and present the potential increase in financial savings by the company associated with such parameter adjustments.

Companies (i.e., employers) may have a spending policy which dictates appropriate company employees' financial and transactional behavior for, for example, reimbursable expenses, purchase guidelines, approved merchants, merchant types, spending amounts (e.g., a daily dollar limit, or meal limit, or trip limit), or the like. The spending policy for each company may be different, and/or comprise different transaction parameters which dictate appropriate transactional behavior based on a company or employee's location, level (e.g., entry level vs. management level), authorization, etc. Therefore, a company may evaluate and possibly change numerous aspects of its spending policy in order to maximize the efficient use of financial resources and maximize savings. Therefore, the company may utilize insights analysis system 150 to analyze transaction information of its consumers and produce recommendations of possible adjustments to the company spending policies (i.e., adjusting spending type parameters), along with the potential financial savings associated with the implementation of such adjustments.

In various embodiments, insights analysis system 150 may comprise an air travel engine 152, a food and beverage engine 154, a ground travel engine 156, and/or a lodging engine 158. Each engine may comprise a processor and a server appliance running a suitable server operating system (e.g., MICROSOFT INTERNET INFORMATION SERVICES or, "IIS") and having database software (e.g., ORACLE) installed thereon. Each engine may analyze a transaction(s) in consumers' transaction history having a specific spending type to determine parameter values associated with the spending type in the transaction information and monetary amounts associated with the parameter values and changes thereto.

The spending policy of a company many dictate standards for parameter values, or parameter benchmark values, which an employee should follow and comply with when conducting transactions. Deviation from the parameter benchmark values may cause unnecessary financial loss. Each engine of insights analysis system 150 may further analyze how changes to the parameter values for different spending types may impact the amount of money spent by a company on the spending types (which may impact company savings). Each engine of insights analysis system 150 may also implement a parameter recommendation to adjust the parameter values if doing so indicates a resulting financial savings.

Figure 2:
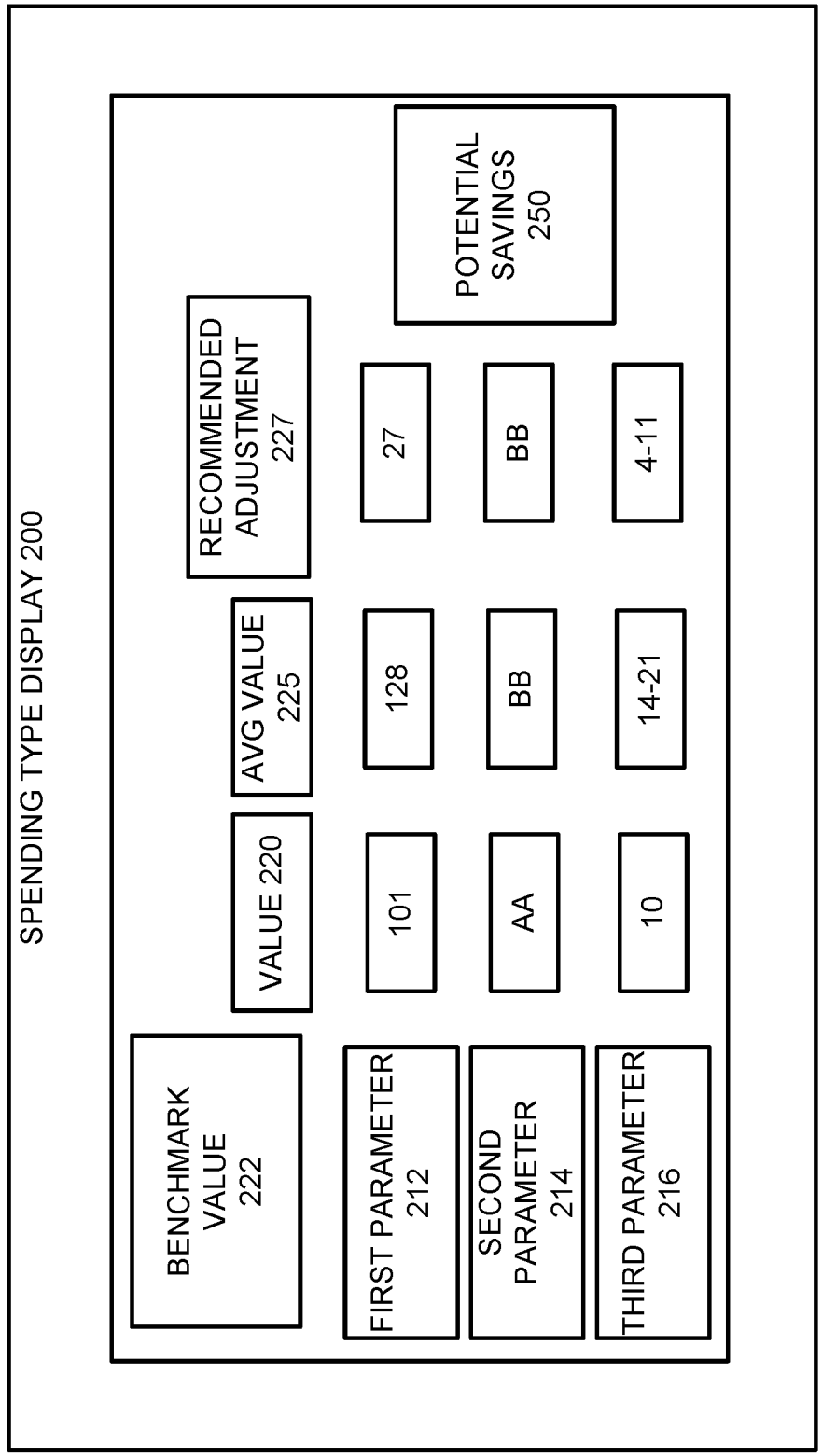
FIG. 2 depicts an exemplary spending type display provided by a insights analysis system, in accordance with various embodiments.

In various embodiments, with combined reference to FIGS. 1 and 2, spending type display 200 may be presented to a user (e.g., a company) of system 100 and/or insights analysis system 150 by insights analysis system 150 on a display screen 122 comprised in web client 120. In various embodiments, the engine of insights analysis system 150 pertaining to the presented spending type on spending type display 200 may cause such a display. For example, for information requested on air travel (i.e., an air travel display), air travel engine 152 may display spending type display 200. For information requested on food and beverage (i.e., a food and beverage display), food and beverage engine 154 may display spending type display 200. For information requested on ground travel (i.e., a ground travel display), ground travel engine 156 may display spending type display 200. For information requested on lodging (i.e., a lodging display), lodging engine 158 may display spending type display 200. In various embodiments, the displays discussed herein may be user interfaces, which may allow a user to provide inputs to insights analysis system 150 (e.g., to select which spending type, parameter, parameter value, and/or other information to be taken into consideration for analysis and/or display). Insights analysis system 150 and/or the respective engine therein may present a user with a requested display in response to receiving a command to do so (e.g., from a user input).

For each spending type displayed on spending type display 200, different information associated with the displayed spending type may also be displayed. A spending type benchmark value 222 may be displayed, which may be an average cost per base unit by peer companies associated with the spending type. For example, for air travel spending type, benchmark value 222 may be an average cost per mile (mile being the base unit); for food and beverage, spending type benchmark value 222 may be an average spend per day or meal (day or meal being the base unit); for ground travel, spending type benchmark value 222 may be an average cost per day or mile (day or mile being the base unit); and for lodging, spending type benchmark value 222 may be an average rate per day (day being the base unit). The parameters 212-216 associated with the displayed spending type may be on spending type display 200, along with a parameter value 220 associated with each parameter 212-216 (e.g., a current value for each parameter), an average value 225 (which may be determined from peer companies, described herein), and a recommended adjustment 227 to the associated parameter 212-216 and/or parameter value 220. Spending type display 200 may also display, in various embodiments, a resulting parameter value, which would result if the company adjusted the spending type parameters in accordance with the respective recommended adjustments 227. Finally, a potential savings 250 may be displayed, which may result in response to the company adjusting the spending type parameters in accordance with the respective recommended adjustments 227. Potential savings 250 may display potential savings associated with making all recommended adjustments 227 to parameters 212-216 and their respective values 220, or a user may view the potential savings associated with making the recommended adjustments 227 to one or any combination of parameters 212-216 and their respective values 220.

In various embodiments, air travel engine 152 may be configured to analyze transaction information indicating that the associated transactions reflect an air travel spending type (e.g., the transaction is for airfare or other services related to air travel) for parameters and associated parameter values. Parameters in the air travel spending type may comprise advance booking (e.g., how far in advance the ticket was booked, for example, 7 days or 21 days), seating class (i.e., service class) (e.g., coach, business, or first class), merchant (because a company may have approved or preferred airlines), merchant type, flight or trip duration (e.g., long haul versus short haul), flight route, ancillary fees (e.g., secondary charges such as upgrade charges, baggage fees, in-flight expenses, membership fees, etc.), and/or the like. Air travel engine 152 may be configured to recognize transaction information (e.g., any of the above parameters, a specified industry or merchant category indicating air travel, a ticket number, or the like) indicating an air travel transaction, and identify the respective transaction and its associated transaction information as an air travel transaction. For example, air travel engine 152 may comprise air travel indicators, such as the parameters above, and match transaction information to the air travel indicators within air travel engine 152, thus identifying the transaction and associated transaction information as relating to air travel. Air travel engine 152 may be further configured to analyze the effect on spending in response to adjustment of the parameter values for the air travel spending parameters (i.e., the potential savings by consumers adjusting their transactional behavior).

In various embodiments, with combined reference to FIGS. 1 and 2, an air travel display (the air travel version of spending type display 200) may be displayed to a user of system 100 and/or insights analysis system 150 via air travel engine 152 and/or insights analysis system 150 on a display screen 122 comprised in web client 120. Parameters 212-216 (there may be more parameters displayed) may reflect those associated with the air travel spending type as listed above.

In various embodiments, food and beverage engine 154 may be configured to analyze transaction information indicating that the associated transactions reflect a food and beverage spending type (e.g., the transaction is at a restaurant, or for food or drinks) for parameters and associated parameter values. Parameters in the food and beverage spending type may comprise allowed meal spend, time of day, merchant (because a company may have approved or preferred restaurants, for example), merchant type (e.g., casual dining may be allowed in the company spending policy, but not fine dining), location, and/or the like. Food and beverage engine 154 may be configured to recognize transaction information (e.g., any of the above parameters, a specified industry or merchant category indicating food and beverage, or the like) indicating a food and beverage transaction, and identify the respective transaction and its associated transaction information as a food and beverage transaction. For example, food and beverage engine 154 may comprise food and beverage indicators, such as the parameters above, and match transaction information to the food and beverage indicators within food and beverage engine 154, thus identifying the transaction and associated transaction information as relating to food and beverage. Food and beverage engine 154 may be further configured to analyze the effect on spending in response to adjustment of the parameter values for the food and beverage spending parameters (i.e., the potential savings by consumers adjusting their transactional behavior).

In various embodiments, with combined reference to FIGS. 1 and 2, a food and beverage display (the food and beverage version of spending type display 200) may be displayed to a user of system 100 and/or insights analysis system 150 via food and beverage engine 154 and/or insights analysis system 150 on a display screen 122 comprised in web client 120. Parameters 212-216 (there may be more parameters displayed) may reflect those associated with the food and beverage spending type as listed above.

In various embodiments, ground travel engine 156 may be configured to analyze transaction information indicating that the associated transactions reflect a ground travel spending type (e.g., the transaction is for a taxi, train, ride share service, rental vehicle, etc.) for parameters and associated parameter values. Parameters in the ground travel spending type may comprise trip duration, trip route, the ground transport or merchant type (e.g., taxis may be allowed in the company spending policy, but not rental vehicles), ground transport type related to duration of trip (e.g., use a rental vehicle for trips of five days or more, but taxis otherwise), time of day, the merchant (because a company may have approved or preferred ground transportation providers, for example), ancillary fees (e.g., rental company insurance, upgrade fees, etc.), and/or the like. Ground travel engine 156 may be configured to recognize transaction information (e.g., any of the above parameters, a specified industry or merchant category indicating ground travel, a ticket number, or the like) indicating a ground travel transaction, and identify the respective transaction and its associated transaction information as a ground travel transaction. For example, ground travel engine 156 may comprise ground travel indicators, such as the parameters above, and match transaction information to the ground travel indicators within ground travel engine 156, thus identifying the transaction and associated transaction information as relating to ground travel. Ground travel engine 156 may be further configured to analyze the effect on spending in response to adjustment of the parameter values for the ground travel spending parameters (i.e., the potential savings by consumers adjusting their transactional behavior).

In various embodiments, with combined reference to FIGS. 1 and 2, a ground travel display (the ground travel version of spending type display 200) may be displayed to a user of system 100 and/or insights analysis system 150 via ground travel engine 156 and/or insights analysis system 150 on a display screen 122 comprised in web client 120. Parameters 212-216 (there may be more parameters displayed) may reflect those associated with the ground travel spending type as listed above.

In various embodiments, lodging engine 158 may be configured to analyze transaction information indicating that the associated transactions reflect a lodging spending type (e.g., the transaction is for a hotel, rental home, etc.) for parameters and associated parameter values.

Parameters in the lodging spending type may comprise advance booking, the lodging or merchant type (e.g., hotels may be allowed in the company spending policy, but not suites), trip duration, lodging type related to duration of trip (e.g., book an extended stay room for trips of fourteen days or more, but standard hotel rooms otherwise), the merchant (because a company may have approved or preferred lodging providers, for example), location, ancillary fees (e.g., incidental charges, amenities fees, etc.), and/or the like. Lodging engine 158 may be configured to recognize transaction information (e.g., any of the above parameters, a specified industry or merchant category indicating lodging, a reservation number, or the like) indicating a lodging transaction, and identify the respective transaction and its associated transaction information as a lodging transaction. For example, lodging engine 158 may comprise lodging indicators, such as the parameters above, and match transaction information to the lodging indicators within lodging engine 158, thus identifying the transaction and associated transaction information as relating to lodging. Lodging engine 158 may be further configured to analyze the effect on spending in response to adjustment of the parameter values for the lodging spending parameters (i.e., the potential savings by consumers adjusting their transactional behavior).

In various embodiments, with combined reference to FIGS. 1 and 2, a lodging display (the lodging version of spending type display 200) may be displayed to a user of system 100 and/or insights analysis system 150 via lodging engine 158 and/or insights analysis system 150 on a display screen 122 comprised in web client 120. Parameters 212-216 (there may be more parameters displayed) may reflect those associated with the lodging spending type as listed above.

Figure 5:
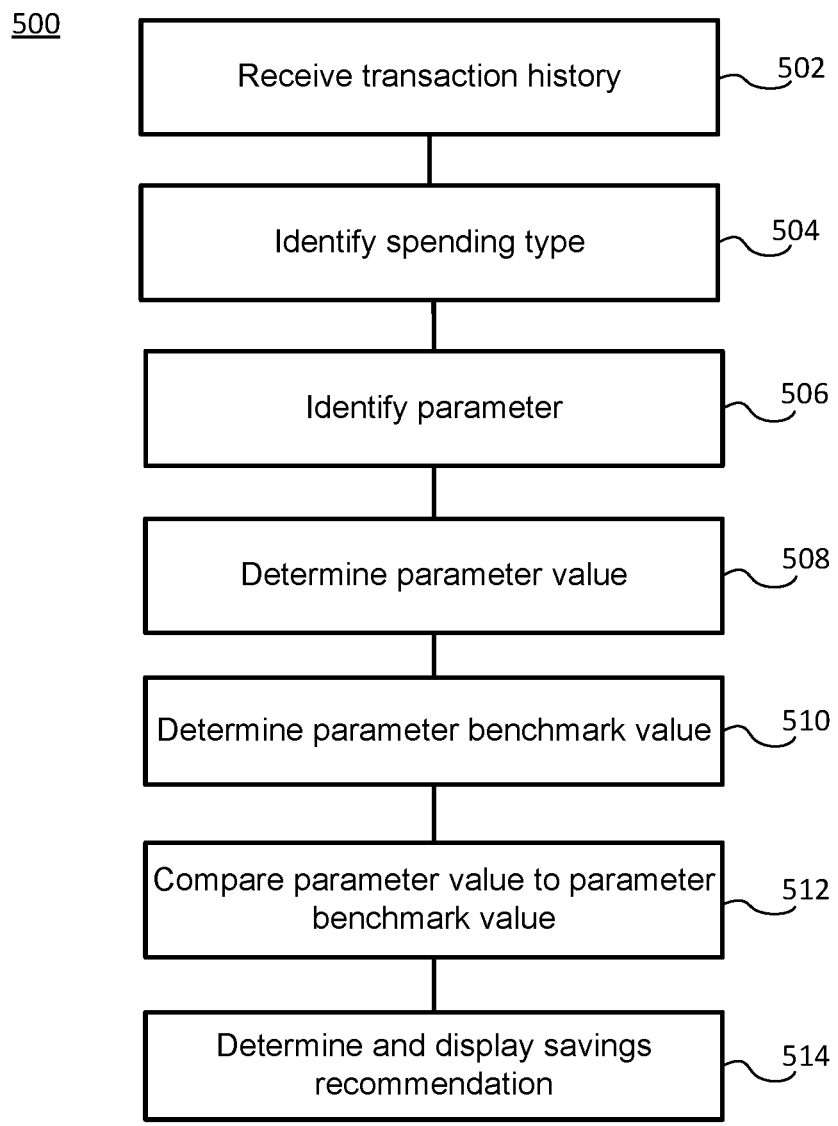
FIG. 5 depicts an exemplary method for determining a savings recommendation, in accordance with various embodiments.

In various embodiments, with additional reference to FIG. 5, which depicts a method 500 for determining a savings recommendation for a spending type, each engine in insights analysis system 150 may be configured to produce a savings recommendation. The savings recommendation may comprise an adjustment to one or more parameters or parameter values of the respective spending type to increase savings in that spending type and/or make the spending type monetary value (e.g., an average spend per base unit) closer to, or better than, a benchmark value (e.g., a goal). In other words, the savings recommendation may provide a suggested change in spending behavior of employees of a company, for example, which may result in company savings.

In various embodiments, insights analysis system 150 may receive transaction history (step 502) for transactions conducted by employees of a company, who are supposed to comply with company spending policies. The transaction history may comprise transaction information associated with numerous transactions, having metadata indicating a spending type for each transaction (e.g., metadata reflecting parameters associated with respective spend types, which insights analysis system 150 and/or the respective engines therein may recognize and match to a respective spending type). Insights analysis system 150 may parse transactions into a plurality of spending types based on the metadata in the transaction information. Insights analysis system 150 may identify a spending type (step 504) (or a spending subtype) of a transaction(s). To determine a spending type, each engine of insights analysis system 150 may analyze transaction information associated with a transaction for spending type indicators, such as described above. For example, air travel engine 152 may look for transaction information reflecting air travel spending such as an airline merchant type, an airline merchant, an air travel ticket or other related item type, and/or the like; food and beverage engine 154 may look for transaction information reflecting food and beverage spending such as a restaurant merchant type, a food services merchant, a food or beverage item or type, a time stamp reflecting a common meal time (e.g., around noon for lunch), and/or the like; ground travel engine 156 may look for transaction information reflecting a ground travel spending such as ground travel merchant type, a ground transportation merchant, a ground travel ticket, and/or the like; lodging engine 158 may look for transaction information reflecting lodging spending such as a lodging merchant type (e.g., hotels, resorts, hospitality services, etc.), a lodging merchant, incidental charges associated with lodging, and/or the like. In response to identifying a spending type indicator, such as those listed above, insights analysis system 150 and/or the respective engine therein may identify the spending type (step 504). The identified spending type may be displayed on spending type display 200.

In response to determining the spending type of a transaction(s), insights analysis system 150 and/or the respective engine therein may identify a parameter (step 506) within the transaction information associated with the identified spending type. The parameter may be identified based on the metadata comprised in the transaction information. For example, insights analysis system 150 and/or the respective engine therein may comprise parameter indicators, such as those reflecting parameters discussed for each spending type, and may match transaction information to the parameter indicators within insights analysis system 150 and/or the respective engine therein, thus identifying the respective parameter. The parameter (e.g., parameters 212-216) may be displayed on spending type display 200. The parameter detected may be any of the parameters listed herein associated with the respective spending type. As part of parameter identification, insights analysis system 150 and/or the respective engines therein may determine a parameter value (step 508) associated with the identified parameter. The parameter value may be transaction information (or metadata comprised therein) indicating the value of the identified parameter. Insights analysis system 150 and/or the respective engines therein may scan the transaction information associated with the identified parameter to identify a parameter value indicator, which may indicate that an associated value is the respective parameter value. In various embodiments, identifying the parameter value indicator may comprise matching a parameter value indicator in the transaction information to a parameter value indicator comprised in insights analysis system 150 and/or the respective engines therein. Insights analysis system 150 and/or the respective engines therein may determine the parameter value as a value associated with the identified parameter value indicator. The parameter value (e.g., value 220) may be displayed on spending type display 20, (e.g., a value of 101 for first parameter 212). For example, insights analysis system 150 and/or air travel engine 152 may identify advance ticket booking (i.e., number of days in advance of the travel the ticket was booked) as the parameter, and determine a parameter value associated with the advance booking parameter by identifying a transaction date (i.e., the date of purchase) and a trip date, and calculating a difference between the two (e.g., measured in days, weeks, or other time unit). Transaction information associated with travel tickets may also indicate the duration of a business trip by listing the departure and arrival dates and times. Parameter values for other parameters, such as merchant type, merchant, seating class, etc., may be a word, number, or other symbol representing the respective parameter. For example, the merchant may be represented by the merchant name, abbreviation, or other merchant identifier associated with the merchant (e.g., for second parameter 214, which may be for the merchant, value 220 for second parameter 214 may be AA, serving as the merchant identifier). The parameter and associated parameter values identifying a merchant, merchant type, seating class, or the like may have been identified prior to analyzing the transaction information, and stored in transaction database 140 and/or insights analysis system 150, such that insights analysis system 150 and/or the respective engine therein may recognize the parameter value during transaction information analysis and identify the parameter and parameter value by matching it with the stored parameter and parameter values.

In various embodiments, the monetary amount of a transaction may be a parameter identified by insights analysis system 150 and/or the respective engine therein, and the parameter value would be the monetary amount (e.g., in U.S. dollars). Relatedly, ancillary fees may be identified as a parameter. Insights analysis system 150 and/or the respective engines may determine the amount of a monetary amount of a transaction attributed to ancillary fees. To do so, an average ancillary percentage may be applied to the transaction monetary amount based on the geographic location, merchant type, merchant, monetary amount, and/or other characteristics of the transaction. That is, the ancillary percentage may be based on an average amount of a transaction total cost that is attributed to ancillary fees in a certain geographic region (e.g., a city, zip code, county, state, etc.), for a certain industry (i.e., merchant type), for a certain merchant, and for a certain transaction amount level. The ancillary percentage may be determined by insights analysis system 150 examining historical transaction data with identified ancillary fee amounts to establish the average amount attributed to ancillary fees based on various transaction characteristics listed above. For example, the purchase of a hotel room in New York City from merchant A may have an average of 15% of the total transaction monetary amount being attributed to ancillary fees. Therefore, lodging engine 158 may determine that 15% of lodging transaction amount matching those characteristics (hotel room in NYC from merchant A) is ancillary fees. In various embodiments, a maximum price may be determined for a transaction scenario having a certain parameter set and/or parameter value set (a parameter set being the parameters, parameter values, and/or characteristics associated with a transaction, such as a parameter set reflecting a hotel room in NYC from merchant A). A transaction may be matched with its corresponding transaction scenario, such that the correct maximum price is utilized, by insights analysis system 150 and/or the respective engines identifying the parameters and/or parameter values of a transaction (and the associated transaction information) and matching them to corresponding parameters and/or parameter values in the parameter set of a transaction scenario. Insights analysis system 150 and/or the respective engines may be configured to determine that any monetary amount, for a transaction having the same or similar parameter set as the transaction scenario associated with the maximum price, above the maximum price is considered an ancillary fee. The maximum price may vary depending on different parameters, such as the location, merchant, merchant type, service class, and/or the like. In various embodiments, ancillary fees may comprise an ancillary fee label in the transaction information, and insights analysis system 150 and/or the respective engines may be configured to identify ancillary fee labels and designate the associated monetary amounts as ancillary fees. The ancillary fee amount may be removed from the transaction total cost as part of data enhancement of the transaction information, so the actual price of the good/service purchased will be analyzed.

In various embodiments, insights analysis system 150 and/or the respective engine therein may determine a spending subtype based on the parameters identified. Spending subtypes may include transactions for the same general service (e.g., air travel), but for significantly different products causing parameter values between spending subtypes to be incomparable. For example, for an air travel spending type, a spending subtype may be a long haul flight (e.g., greater than 2000 miles), or a short haul flight (e.g., less or equal to 2000 miles) based on the flight duration parameter, because pricing differences (including ancillary fees) may be drastically different between short and long haul flights. Similarly, for a food and beverage spending type, a spending subtype may be a fine dining versus casual dining because of the price differences.

Each transaction may comprise a time stamp in the associated transaction information. Insights analysis system 150 and/or the respective engine therein may detect the time stamp, and identify the associated time of day as a parameter and parameter value of the respective spending type. Identification of the time stamp may allow insights analysis system 150 and/or the respective engine therein to determine, for example, the nature of a transaction (e.g., a breakfast, lunch, or dinner purchase), whether the transaction was in compliance with company policy (e.g., a transaction between midnight and 6 A.M. may be prohibited), or the like.

In various embodiments, insights analysis system 150 and/or the respective engine therein may determine a parameter benchmark value (step 510) associated with a respective parameter. The parameter benchmark value may be an aspirational value for the respective parameter (i.e., a value of the parameter which would maximize or improve savings and/or financial efficiency of company funds). In various embodiments, insights analysis system 150 and/or the respective engine therein may determine a parameter benchmark value for a parameter by determining an average parameter value (or most common parameter value, in the case of merchant types, merchants, or other non-numerical values) of peer companies (e.g., average value 225 displayed on spending type display 200). Peer companies may be companies of similar size, gross income levels, and/or spending levels. For example, peer companies may be placed in peer company categories based on their size, gross income levels, and/or spending levels being within a range assigned to each category. The average parameter value may be determined by insights analysis system 150 and/or the respective engine therein analyzing peer companies' transaction histories, determining spending types (or spending subtypes) of transactions, identifying parameters associated with the spending types (or spending subtypes), determining parameter values (similar to steps 504-506 for the subject company), and averaging the parameter values, and/or determining the most common parameter value. In various embodiments, the parameter values may be averaged for each transaction scenario having different parameter sets. That is, the average parameter value of a parameter may be calculated by using parameter values of the parameter found in transactions having like parameter sets (i.e., the same or similar transactions having the same or similar parameters or characteristics).

In various embodiments, the parameter benchmark value may be determined by insights analysis system 150 and/or the respective engine therein analyzing historical transaction information associated with peer companies to determine which parameter values result in the lowest cost to the company (i.e., the most savings). To do so, insights analysis system 150 and/or the respective engine may obtain transactions having the parameter of interest comprising various parameter values, but such transactions also having the same or similar parameters sets comprising other parameters and parameter values (i.e., the parameter of interest may be the only parameter value that is significantly varying between the analyzed transactions so that the parameter values of other parameters serve as constants). The transaction costs (i.e., prices) of the transactions associated with each parameter value of the parameter of interest may be averaged (e.g., average the transaction costs for transactions having a first parameter value for the parameter of interest, average the transaction costs for transactions having a second parameter value for the parameter of interest, etc.). Insights analysis system 150 and/or the respective engine therein may determine which parameter value of the parameter of interest is associated with the lowest average costs to the company (e.g., the parameter benchmark value) by comparing the average transaction costs for transactions having each analyzed parameter value for the parameter of interest. For example, insights analysis system 150 and/or the respective engine therein may determine that an advance booking (the parameter of interest) of 14-21 days (the parameter value) (i.e., transportation is booked 14-21 days in advance) results in the lowest average cost relative to the average cost of transactions having advance booking of different values (e.g., 7-13 days prior or over 21 days prior). As another example, insights analysis system 150 and/or the respective engine therein may determine that, for a merchant type parameter, using ride share services (a first parameter value) results in a lower average cost than taxis (a second parameter value). A parameter benchmark value for a parameter of interest may be determined for each transaction scenario having different parameter sets (i.e., the other parameters of the transaction besides the parameter of interest are different), because as can be expected, the effect of a parameter value may be depend on the other aspects (i.e., parameter values in the parameter set) of a transaction. That is, a parameter benchmark value may be determined for the parameter of interest in a transaction having a first parameter set (by averaging the parameter values of the parameter of interest in each transaction having the first parameter set), a different parameter benchmark value may be determined for the parameter of interest in a transaction having a second parameter set (by averaging the parameter values of the parameter of interest in each transaction having the second parameter set), and so on. In various embodiments, the parameter benchmark value may be determined in relation to all transactions, or any desired subset of transactions.

In various embodiments, insights analysis system 150 and/or the respective engine may compare the determined parameter value associated with the identified parameter with the parameter benchmark value associated with the identified parameter (step 512). A parameter value difference may be produced in response to the comparison. The compared parameter benchmark value used for the comparison may be one associated with transactions having a similar parameter set to the analyzed transaction. With parameters having non-numerical values (e.g., merchant types, merchant, etc.), the comparison between the determined parameter value and the parameter benchmark value may be binary: either the two match or they do not. With parameters having numerical values (e.g., days in advance booking, seating class level, or other service levels, such as luxury versus standard vehicles for ground travel, or fine versus casual dining), a numerical difference may be calculated. A parameter value difference that is unfavorable may indicate opportunities for a company to improve spending policy and/or employee spending behavior, and/or that employee spending behavior is noncompliant with the spending policy rules.

In response to the comparison between the parameter value to the parameter benchmark value indicating an unfavorable difference between the two (i.e., the parameter value is not optimized), insights analysis system 150 and/or the respective engine therein may determine a savings recommendation (step 514). In various embodiments, the savings recommendation may be a parameter adjustment recommendation, which may be a recommendation for the company to adjust the targeted parameter value by consumers (e.g., to cause the parameter value to more closely resemble, or become more beneficial than, the parameter benchmark value), or instruct employees when conducting the associated transactions to transact in a way that improves the resulting parameter value (e.g., by changing the company spending policies). In various embodiments, the savings recommendation may comprise a recommendation to correct employee transaction behavior (i.e., correct noncompliant behavior which may have bene determined by a (significant) difference between the parameter value and the benchmark value.

The parameter adjustment recommendation may be displayed (step 514) to the user company, such as recommended adjustment 227 on spending type display 200. For example, for the analyzed transaction, if the parameter value of advance booking (e.g., third parameter 216 on spending type display 200) is 10 days before the trip (e.g., value 220 for third parameter 216), but the parameter benchmark value is 14-21 days (e.g., average value 225 for third parameter 216), insights analysis system 150 and/or the respective engine therein may determine and display to the company user a parameter adjustment recommendation to have trips booked 14-21 days (e.g., as reflected in a recommended adjustment 227 for third parameter 216 of 4-11 days). As another example, insights analysis system 150 and/or the respective engine therein may determine and display to the company user a parameter adjustment recommendation to use a different merchant in transactions for the subject spending type.

Figure 6:
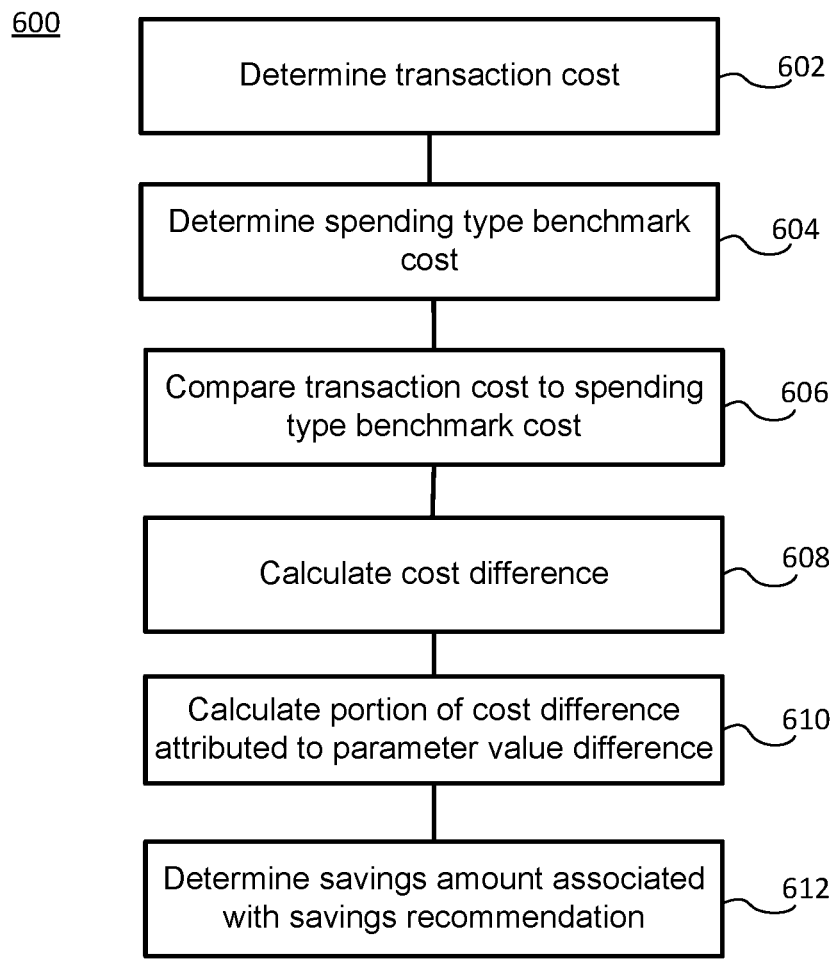
FIG. 6 depicts exemplary method for determining a savings amount, in accordance with various embodiments.

In various embodiments, the effect of implementing the savings recommendation (e.g., the savings amount) may be calculated through method 600 depicted in FIG. 6. With combined reference to FIGS. 1, 2, and 5-6, insights analysis system 150 and/or the respective engines therein may determine a transaction cost (step 602) associated with the transaction analyzed. The transaction cost may be the price paid for goods or services, which, in various embodiments, may exclude the cost of ancillary fees, determined as described herein. In various embodiments, the transaction cost may be the price paid (e.g., less ancillary fees) divided by the number of base units associated with the transaction. For example, insights analysis system 150 and/or the respective engines therein may calculate the length (in miles, for example) of an air or ground travel trip by determining the distance between the start and end locations. Then, the price paid may be divided by the number of miles so the transaction cost may be the cost per mile (mile being the base unit). As another example, insights analysis system 150 and/or the respective engines therein may calculate the number of days for a lodging stay, and divide the price paid for the lodging stay by the number of days, so the transaction cost may be cost per day (day being the base unit).

Insights analysis system 150 and/or the respective engines therein may determine a spending type benchmark cost (step 604), which may be an aspirational cost for the respective spending type (e.g., reflecting the average or best performance in transaction costs of peer companies to the user company), or a spending/savings goal of the user company of insights analysis system 150. Insights analysis system 150 and/or the respective engines therein may determine the spending type benchmark cost by taking an average of the transaction costs of transactions of the same spending type (or spending subtype), which may have the same or similar parameter sets, such that the costs for similar transactions are averaged together. In various embodiments, the spending type benchmark cost may be determined by averaging the transaction costs of transactions having similar parameter values. In various embodiments, the spending type benchmark cost may be determined by adding the transactions costs of all transactions being analyzed and dividing by the total number of base units associated with all the transactions, such that the spending type benchmark cost is a benchmark monetary amount per base unit (e.g., cost per mile, cost per day, or the like). In various embodiments, the spending type benchmark cost may be determined by calculating the transaction cost of each transaction, which may comprise dividing the price paid for the transaction by the number of base units associated with the transaction, similar to the determination of the transaction cost in step 602, and averaging the calculated transaction costs. The transactions used to calculate the spending type benchmark cost for the user company may be those having parameter values compliant with the company's financial policies (e.g., booking at the correct time, transacting with approved merchants, etc.), and therefore, the spending type benchmark cost may be reflective of the transaction costs desired by the company.

The transaction cost may be compared to the spending type benchmark cost (step 606), and a cost difference may be calculated (step 608). The cost difference may be a monetary amount, or a price paid difference divided by a base unit, as discussed above. The savings recommendation provided in Step 512 in method 500 is configured to cause the company to make a transaction behavior adjustment to decrease any unfavorable cost difference (i.e., a difference between the transaction cost and the spending type benchmark cost reflecting the opportunity for parameter value improvement and resulting financial savings).

In response to the cost difference being calculated, insights analysis system 150 and/or the respective engines therein may calculate a portion of the cost difference attributed to the parameter value difference (step 610) calculated in response to step 512 in method 500. In various embodiments, the parameter of interest may be given a weight, which may reflect the importance of a certain parameter to a company (the company may assign the weight). The weight may be assigned to the parameter based on the parameter value difference calculated in response to step 512 in method 500, because the severity of the parameter value difference may affect the parameter's causal portion of the cost difference. Therefore, the weight assigned to the parameter may be applied to the first cost difference. In various embodiments, the calculation of the portion of the cost difference attributed to the parameter value difference calculated in response to step 512 in method 500 may be based on the cost differences analyzed and detected by insights analysis system 150 and/or the respective engines therein analyzing historical transaction information to determine a parameter benchmark value of the respective parameter. That is, insights analysis system 150 and/or the respective engines therein may have calculated the level of cost difference (i.e., the change in a transaction cost or an average transaction cost) caused by the various differences in a parameter value for transactions having otherwise similar parameter sets (i.e., detecting a correlation between a change in parameter value and a cost difference amount). Explained further, insights analysis system 150 and/or the respective engines therein, to calculate the cost difference attributed to changing of the parameter value of the parameter of interest, may compare the average cost between two transaction scenarios having a parameter set similar to the transaction (or set of transactions) being analyzed, but differing in the parameter value for the parameter of interest. Therefore, the difference in the costs between the two compared transaction scenarios may be attributable to the parameter value change of the parameter of interest, because that parameter value was the only significant difference between the compared transaction scenarios and their parameter sets. The portion of the cost difference may be calculated by dividing the cost difference attributed to the parameter value change (suggested in the savings recommendation) by the transaction cost of the transaction.

In response to calculating the portion of the cost difference attributed to the parameter value difference calculated in response to step 512 in method 500, insights analysis system 150 and/or the respective engines therein may determine the savings amount associated with the savings recommendation (step 612) determined in step 514 of method 500. The savings amount may be similar or equal to the portion of the cost difference that was attributed to the parameter value difference, as calculated in step 610. In other words, by implementing the savings recommendation determined in step 514 of method 500, the company may reduce the transaction cost (and increase savings) by the portion attributed to the parameter value difference, or the savings amount, if different.

In various embodiments, the steps 506-514 in method 500, and steps 602-612 in method 600, may be repeated for a second parameter (or third parameter, fourth parameter, etc.) in the analyzed transaction to determine a second savings recommendation to adjust a second parameter value associated with the second parameter. Therefore, insights analysis system 150 and the engines therein may be utilized to provide savings recommendations for multiple parameters within a spending type (for a transaction or a group of transactions) in order to optimize the savings amount. Likewise, the steps 506-514 in method 500 may be repeated for parameters within a second transaction (or third transaction, fourth transaction, and so on), to provide savings recommendations for multiple a parameter(s) in multiple transactions.

Figure 7:
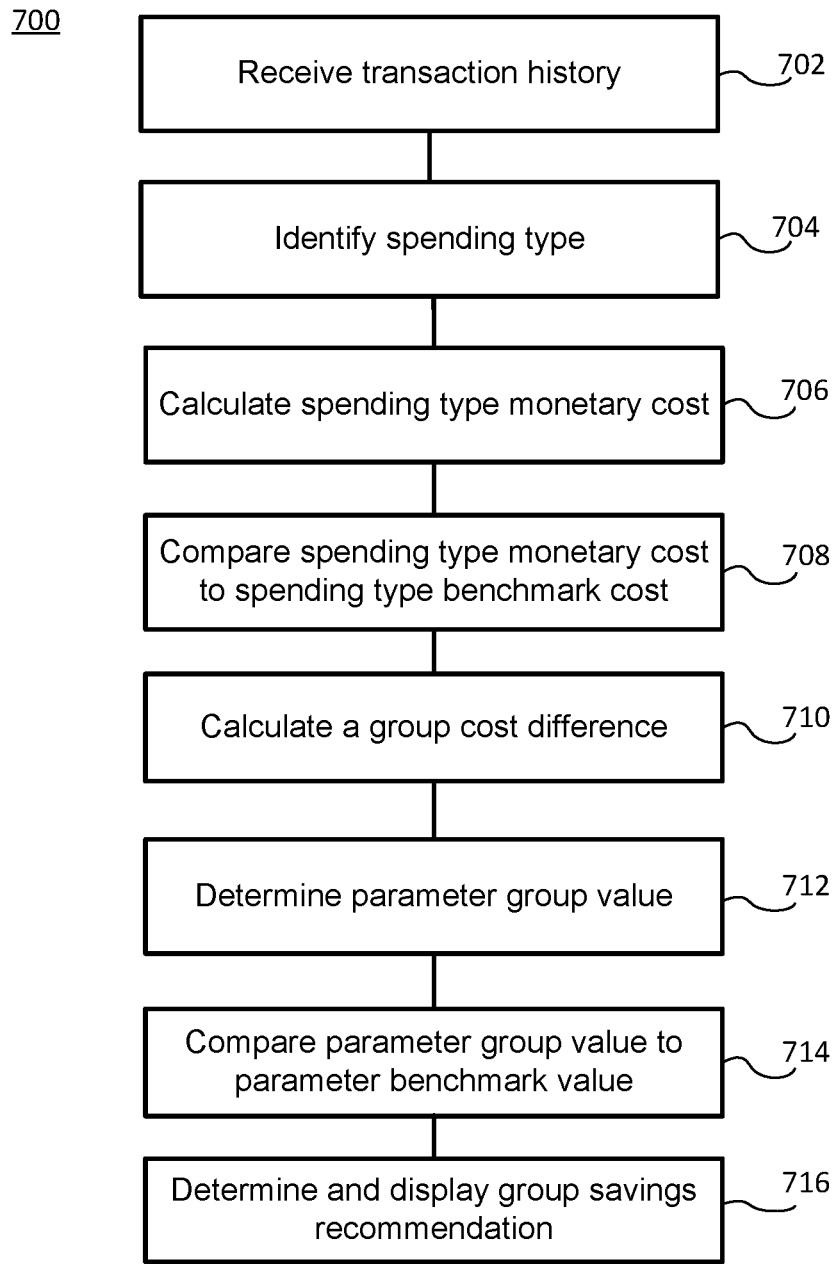
FIG. 7 depicts exemplary method for determining a group savings recommendation, in accordance with various embodiments.

In various embodiments, steps 502-514 of method 500 may be conducted for multiple transactions to determine a savings recommendation for adjustment to all transactions within a spending type. Along similar lines, with additional reference to FIG. 7, method 700 depicts a method for determining a group savings recommendation, in accordance with various embodiments. Insights analysis system 150 and/or the respective engines therein may receive transaction history (step 702) comprising transaction information associated with numerous transactions. Insights analysis system 150 and/or the respective engines therein may identify a spending type (step 704) (or a spending subtype) for a group of transactions, for example, by the methods discussed herein regarding determining the spending type of a transaction in step 504, above. The transactions of the group of transactions may all be identified as the same spending type. Each of the transactions in the group of transactions may comprise a common parameter (which may be identified, similar to step 506 by insights analysis system 150 and/or the respective engines therein).

In various embodiments, insights analysis system 150 and/or the respective engines therein may calculate a spending type monetary cost (step 706) reflecting the cost associated with the group of transactions. Insights analysis system 150 and/or the respective engines therein may calculate the spending type monetary cost by taking an average of the transaction costs (e.g., purchase prices for goods or services) of the group of transactions. In various embodiments, the spending type monetary cost may be the total spend (i.e., total monetary amount) for all analyzed transactions, divided by the total number of base units for all analyzed transactions (e.g., total miles traveled for all transactions, total days traveled or stayed for all transactions, or the like, associated with the analyzed transactions), such that the spending type monetary cost is a group average monetary amount per base unit. In various embodiments, the spending type monetary cost may be determined by calculating a transaction cost divided by a base unit for each transaction, and then averaging the resulting values (such that the spending type monetary cost is a group average monetary amount per base unit). For example, for air travel, insights analysis system 150 and/or air travel engine 152 may calculate the average cost per mile of travel for each transaction, and then average those cost per mile values to calculate the spending type monetary cost. As another example, for ground travel, insights analysis system 150 and/or ground travel engine 156 may calculate the average cost per day for ground travel that a consumer is on a trip, for each trip, and then average those cost per day values to calculate the spending type monetary cost. In various embodiments, the spending type monetary cost may be calculated (e.g., by averaging) for transactions having similar parameter sets.

In response to calculating the spending type monetary cost, insights analysis system 150 and/or the respective engines therein may compare the spending type monetary cost to the spending type benchmark cost (step 708), as calculated in step 604 of method 600. As discussed in relation to step 604 of method 600, the spending type benchmark cost may be an aspirational cost for the respective spending type (e.g., reflecting the average or best performance in transaction costs of peer companies to the user company), or a spending/savings goal set by the user company of insights analysis system 150. In response, insights analysis system 150 and/or the respective engines therein may calculate a group cost difference (step 710) between the spending type monetary cost and the spending type benchmark cost. The group cost difference may be a monetary amount, or a cost difference per base unit, as discussed above.

In various embodiments, insights analysis system 150 and/or the respective engines therein may calculate a group parameter value (step 712) for the respective spending type (or spending subtype) in the group of transactions. The group parameter value may reflect the average parameter value of a parameter of interest for the respective spending type (or spending subtype). Insights analysis system 150 and/or the respective engines therein may calculate the group parameter value by taking an average of the parameter value for the parameter of interest reflected in each of the group of transactions (or selecting the most common parameter value, in the case of merchant types, merchants, or other parameters having parameters having non-numerical values). In various embodiments, the group parameter value may be calculated for a group of transactions (which may be a subgroup of the analyzed transaction group) having the same or similar parameter set of other parameters in each of the transactions in the group. That way, the parameter values for the parameter of interest may be utilized for similar transactions (different transactions having different parameter sets may reflect different parameter values and parameter benchmark values).

In response to calculating a group parameter value for the parameter of the interest in the group to transactions, insights analysis system 150 and/or the respective engines therein may compare the group parameter value to the parameter benchmark value for the parameter of interest. The parameter benchmark value may be calculated as described in relation to step 510 of method 500 (FIG. 5). As discussed, the parameter benchmark value may be an aspirational value for the respective parameter (i.e., a value of the parameter which would maximize savings and/or financial efficiency of company funds). A group parameter value difference may be produced in response to the comparison, indicating the difference between group parameter value to the parameter benchmark value for the parameter of interest. The group parameter value difference may be an unfavorable difference, indicating that the group parameter value is for the parameter of interest at the user company may not be optimized. Therefore, the group parameter value may be adjusted to decrease company costs and increase savings.

Insights analysis system 150 and/or the respective engine therein may determine a group savings recommendation (step 716) to decrease the group cost difference between group parameter value to the parameter benchmark value (if the group cost difference is unfavorable compared to spending type benchmark cost, i.e., there is opportunity to improve company spending efficiency and savings), or improve company spending efficiency and savings regardless of the group cost difference. In various embodiments, the group savings recommendation may be a group parameter adjustment recommendation, which may be a recommendation for the company to adjust the parameter value of the parameter of interest across the company (e.g., to cause the parameter value to more closely resemble, or become more beneficial than, the parameter benchmark value). A company may implement such a group savings recommendation by changing their spending policies, for example, by saying that all travel tickets should be booked a certain number of days in advance, or only certain merchants should be transacted with for certain spending types, etc.

The group parameter adjustment recommendation may be displayed (step 716) to the user company, such as recommended adjustment 227 on spending type display 200 (wherein parameters 212-216 may represent parameters from a group of transactions, values 220 may be group parameter values, and recommended adjustments 227 may be a group savings recommendations). For example, for the analyzed group of transactions, if the group parameter value of the merchant user (e.g., second parameter 214 on spending type display 200) is merchant AA (e.g., value 220 for second parameter 214), but the parameter benchmark value is merchant BB (e.g., average value 225 for second parameter 214), which may be a preferred or partnered merchant, insights analysis system 150 and/or the respective engine therein may determine and display to the company user a group parameter adjustment recommendation to use merchant BB for transactions of that spending type (or spending subtype) (e.g., as reflected in a recommended adjustment 227 for second parameter 214 of "BB"). As another example, insights analysis system 150 and/or the respective engine therein may determine and display to the company user a parameter adjustment recommendation to use a different merchant in transactions for the subject spending type.

The cost difference and/or potential savings 250 associated with implementation of the group savings recommendation may be calculated and displayed on spending type display 200 (similar to the calculation discussed in relation to step 610 in method 600). For example, insights analysis system 150 and/or the respective engines therein may compare average costs for transaction scenarios having similar parameter sets, except differing in the parameter values of the parameter of interest. Insights analysis system 150 and/or the respective engines therein may identify the transaction scenario of the transactions scenarios compared that resulted in the best cost savings and/or is the most feasible for the user company to implement, and identify the parameter value of the parameter of interest for that transaction scenario. The identified parameter value (or the adjustment to the user company's current parameter value to achieve the identified parameter value) may be the group savings recommendation. The potential cost savings from the group savings recommendation may be the difference between the average cost from the transaction scenario having the identified parameter value and the spending type monetary cost (as calculated in step 706) resulting from company user's current parameter group value (as determined in step 712).

Potential savings may also be calculated in a similar manner for multiple parameter changes, within various spending types or spending subtypes, within various markets, and/or the like.

Steps 702-716 of method 700 may be repeated for any number of parameters in a group of transactions to determined group savings recommendations for any one or combination of parameters. Potential savings 250 may be displayed on spending type display 200 potential savings associated with making all recommended adjustments 227 (e.g., group savings recommendations) to parameters 212-216 and their respective values 220, or a user company may view the potential savings associated with making the recommended adjustments 227 to one or any combination of parameters 212-216 and their respective values 220. The savings in response to implementing group savings recommendation(s), as described in relation to step 716 of method 700, may be calculated by insights analysis system 150 and/or the respective engines therein detecting the different spending type monetary cost amounts associated with different group parameter values (i.e., detecting a correlation between a change in group parameter value and a group cost difference amount). Therefore, potential savings 250 displayed on spending type display 200 may be the group cost difference amount correlated with the recommended change in group parameter value.

Figure 3:
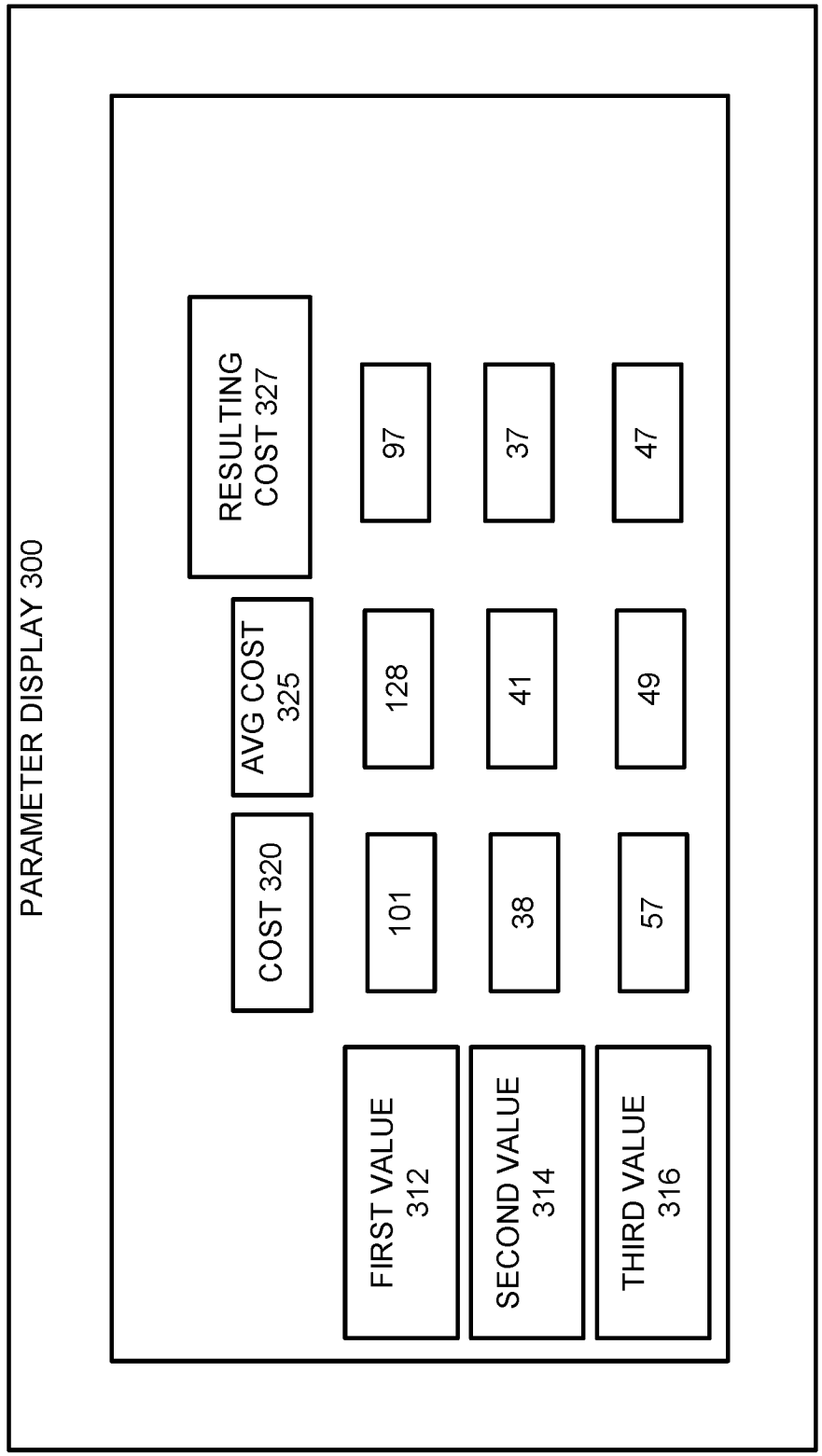
FIG. 3 depicts an exemplary parameter display provided by a insights analysis system, in accordance with various embodiments.

In various embodiments, with combined reference to FIGS. 1, 3, and 5-7, the results of methods 500-700 may be presented on a parameter display 300 as depicted in FIG. 3. Parameter display 300 may provide the user company with a screen to compare the changes of a (group) parameter value to different levels, and the associated resulting cost and/or savings. A user company may navigate to parameter display 300 my selecting one of parameters 212-216 on spending type display 200). For example, for the parameter of advance booking, which the user company may have selected to view on parameter display 300, first parameter value 312 may be 0-6 days booking in advance, second parameter value 314 may be 7-13 days booking in advance, and third parameter value 316 may be 14-21 days booking in advance. The cost 320 may be displayed for each parameter value 312-316, along with the average parameter cost 325 (calculated from peer companies, which may also be a benchmark parameter value). The costs 320 and average parameter costs 325 may be associated with transactions have similar parameter sets. Cost 320 may be an average cost per base unit (cost per mile, cost per day, etc.) As shown in this example, booking 7-13 days in advance (parameter value 314) is the most cost-effective and will result in the most company savings. Additionally, parameter display 300 may display a resulting cost 327 for each parameter value 312-316, which may reflect the cost after implementing (group) savings recommendations for other parameters (e.g., changing the merchant, changing the seating class, ancillary fee amounts, or the like). Other examples of parameters displayed on parameter display 300 may be seating class (wherein values 312-316 may be coach, business class, and first class), merchant (wherein values 312-316 may be different merchants for a spending type), merchant type (wherein values 312-316 may be fast food, casual dining, and fine dining for food and beverage spending type, ride share, taxi, and rental car for ground travel spending type, etc.), and/or the like.

Figure 4:
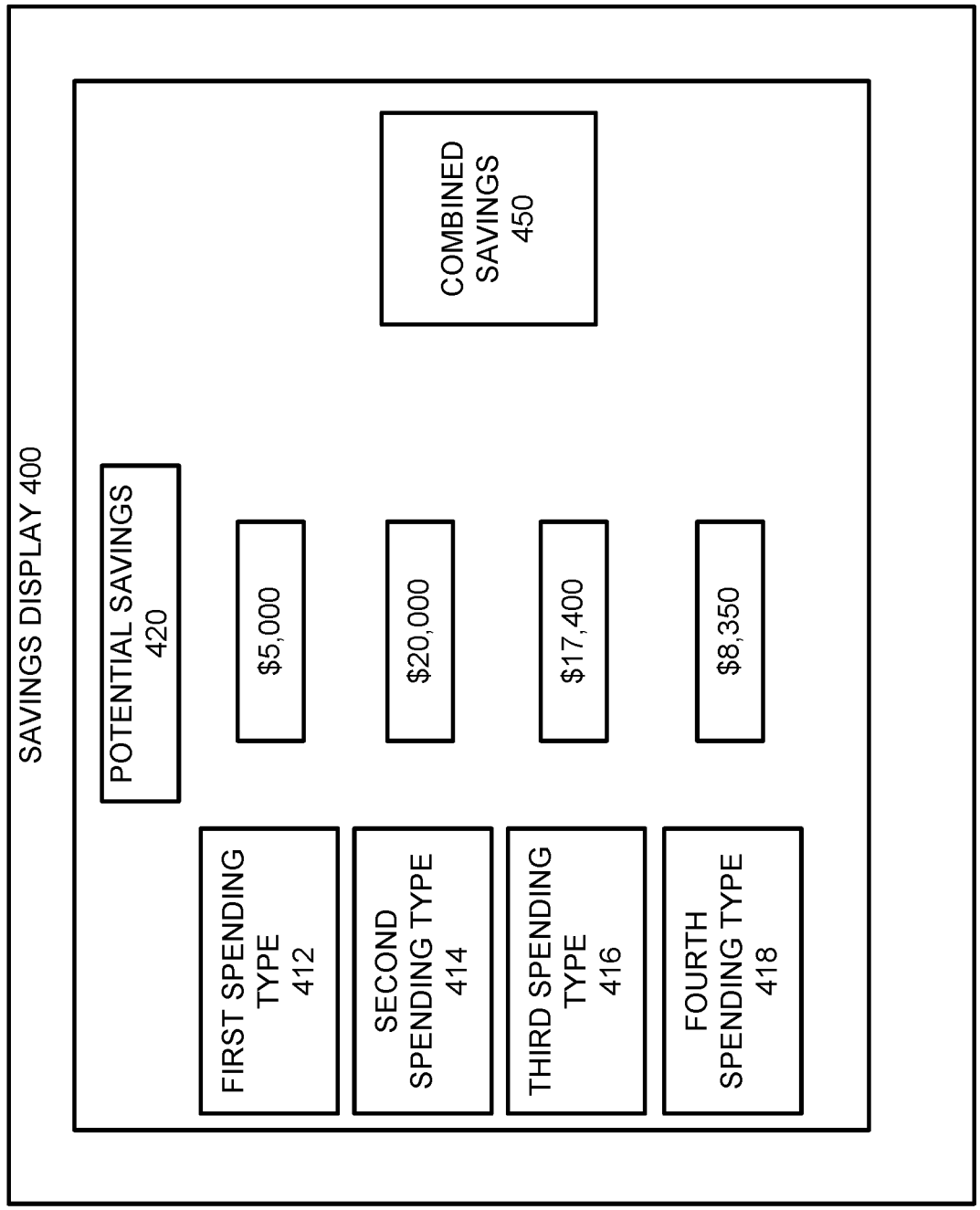
FIG. 4 depicts an exemplary savings display provided by a insights analysis system, in accordance with various embodiments.

In various embodiments, with additional reference to FIG. 4, savings display 400 may display the potential savings 420 for each spending type 412-418 resulting from implementing (group) savings recommendations determined from method 500 and/or 700. In various embodiments, the current spending amount for each spending type 412-418 may be displayed on savings display 400, along with the average spending amount for each spending type 412-418 determined from analyzing the spending of peer companies. The potential savings for a user company in response to implementing one or more (group) savings recommendations may be determined by insights analysis system 150 and/or the respective engines therein detecting the different spending type monetary cost amounts associated with different group parameter values for multiple parameters (i.e., detecting a correlation between a change in group parameter value and a spending type monetary cost or group cost difference amount). Potential savings 420 for each spending type 412-418 may reflect the user company implementing one, a combination of, or all of the (group) savings recommendations to optimize company spending and savings. Therefore, potential savings 420 displayed on savings display 400 may be the group cost difference amount correlated with the recommended changes in group parameter values of various parameters (i.e., one or more) in the respective spending types. Insights analysis system 150 may add up the potential savings 450 for spending type 412-418, and present the user company with a total potential savings 450 reflecting the possible result of implementing all (group) savings recommendations in all spending types.

In various embodiments, a user company may be able to select which parameters, parameter values, savings recommendations, spending types, etc. are used in producing (group) savings recommendations and/or potential savings. The user may simply select those items for insights analysis system 150 to utilize in its analysis by provide inputs to insights analysis system 150 (e.g., by selecting a selector on display screen 122). Thus, a user company may determine the adjustments to parameter values that would most greatly affect potential savings.

In various embodiments, each spending type (or spending subtype) analyzed may be customized to select, for example, the peer group for the subject consumer engaging in the transactions (so the cost amounts are measured against consumers of similar employee levels), geographic location (because some locations may be more expensive than others), time of year, or other variables so that any comparisons between a spending (sub)type, parameter values, monetary costs, etc. may be compared against values and amounts from comparable consumers and transactions with comparable rules and expectations. Additionally or alternatively, the parameter set(s) for transactions to which the current transactions are compared and analyzed by insights analysis system 150 and/or the respective engines therein may be customized or specifically selected by the user.

Figure 8:
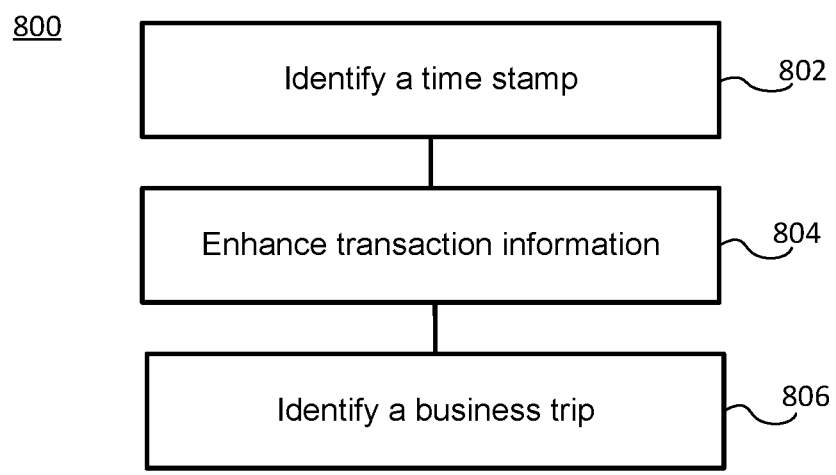
FIG. 8 depicts exemplary method for detecting a transaction of interest, in accordance with various embodiments.

Transaction information from a company's employees may not all be related to business travel expenses, which is the transaction type to be analyzed by insights analysis system 150 and the respective engines therein. Therefore, insights analysis system 150 may implement method 800 (depicted in FIG. 8) to determine which transactions, and associated transaction information, are transactions of interest to be analyzed by insights analysis system 150. In various embodiments, to determine whether a transaction is a transaction of interest (e.g., a transaction for a meal to be analyzed by food and beverage engine 154), insights analysis system 150 may identify a time stamp (step 802) in the transaction information. The time stamp may reflect the date and time of day the transaction was conducted. Therefore, insights analysis system 150 and the respective engines therein may determine the nature of the transaction based on the time stamp and/or additional transaction information (the merchant, merchant type, etc.). For example, insights analysis system 150 and/or food and beverage engine 154 may determine that a transaction is for breakfast if conducted between 6 and 11 A.M., for lunch if conducted between 11 A.M. and 5 P.M., and/or for dinner if conducted between 5 P.M. and 12 A.M. with a restaurant merchant. Identifying the time stamp of a transaction may also allow insights analysis system 150 to determine if the transaction is compliant with company policy or not (e.g., a time stamp between midnight and 6 A.M. may indicate noncompliant spending, for example, on alcohol or other prohibited items or activities).

In various embodiments, before determining (group) savings recommendations, as described in relation to methods 500 and 600, the transaction information to be analyzed may be enhanced (step 804). Such enhancement may include decoding the data, which may determine the duration of the travel (flight time, hotel stay, duration of ground travel, or the like). A business trip may also be identified (step 806), because the transactions related to travel expenses are the transactions to be analyzed by insights analysis system 150. A business trip may be detected by determining a first day and last day of the business trip. Insights analysis system 150 may analyze geographic locations of pairs of consecutive transactions in the transaction history received by insights analysis system 150, and identify two consecutive transactions having distant geographic locations. That is, if a first transaction has a geographic location that is greater than a predetermined travel distance (i.e., a distance between two geographic locations that is of sufficient distance to indicate a business trip, such as 50 or 100 miles) from the geographic location of a second transaction, that is a subsequent, consecutive transaction to the first transaction, such a distance between two transactions indicates a business trip, and insights analysis system 150 may recognize the same. Additionally, the first day of a business trip may be determined based on the first transaction of the pair of transactions having a geographic location that is deemed a home location for the associated consumer, and the second being a predetermined distance from the home location. Accordingly, a last day of the business trip may be determined by identifying a pair of consecutive transactions (subsequent to the two transactions analyzed to determine the first day of the business trip), again, having associated geographic locations that are greater than a predetermined travel distance form one another. The geographic location of the second transaction of the pair of transactions may be a home location for the associated consumer, indicating the end of the business trip (i.e., the last day). In various embodiments, ticket information for air travel or ground travel, and/or lodging information for a reservation, may list the first and last days of the business trip, which insights analysis system 150 may identify.

Some merchants may have centralized billing systems, meaning that no matter where the actual transaction took place, the bill reflects the geographic location of the centralized billing department. Insights analysis system 150 may identify centralized billing merchants from a list of the same, or by analyzing the geographic locations of transactions conducted by the consumer proximate in time to the transaction of interest. Insights analysis system 150 may determine that a merchant in a transaction has a centralized billing system because insights analysis system 150 may identify all transactions proximate in time (e.g., within 2 hours, 5 hours, one day, or the like) to the transaction of interest are in a different (and perhaps, consistent) geography location. Therefore, insights analysis system 150 may assign the transaction from the centralized billing merchant to the same geographic location as the surrounding transactions. Insights analysis system 150 may implement a similar technique to determine a questionable location for any transaction.

In various embodiments, as part of enhancing the transaction information (step 804), insights analysis system 150 may also determine the business trip destinations by identifying the geographic locations of the transactions (similar to the analysis described above in determining business trip determination). Additionally, business trip itinerary (e.g., layovers, stops in multiple cities, etc.) may be determined based on itinerary information comprised in the transaction information (e.g., in metadata). Transactions during the business trip may be flagged by insights analysis system 150 for analysis as described herein.

In various embodiments, as another part of enhancing the transaction information (step 804), insights analysis system 150 may determine cancelled travel plans. Insights analysis system 150 may identify a travel expense (e.g., an air or ground ticket reservation, hotel reservation, or the like) charge in the transaction information, and also identify a negative charge (i.e., a credit to the transaction account). Insights analysis system 150 may match the travel expense with the negative charge by matching the transaction costs (e.g., a debit and credit for the same amount), the merchant, the item purchased, and/or the like. Thus, cancelled travel plans, and travel expenses associated therewith, may be excluded from the analysis of insights analysis system 150.

The systems and methods discussed herein improve the functioning of the computer. For example, by utilizing insights analysis system 150 including any of the engines 152-158 comprise therein, optimal parameter values for different transactions of different spending types may be determined, allowing a company to identify financial waste and change spending behavior to optimize savings. A user company of system 100 and/or insights analysis system 150 may select which spending types, parameters, parameter values, and/or other metrics may be most useful in evaluating what changes could be made to company spending policies and habits in order to maximize savings. System 100 and/or insights analysis system 150 may calculate the potential spending differences (i.e., potential savings) correlated with changes in spending behavior (i.e., parameter values), and communicate the same to users.

The disclosure and claims do not describe only a particular outcome of determining savings recommendations, but the disclosure and claims include specific rules for implementing the outcome of determining savings recommendations and that render information into a specific format that is then used and applied to create the desired results of determining fin savings recommendations, as set forth in McRO, Inc. v. Bandai Namco Games America Inc. (Fed. Cir. case number 15-1080, Sep. 13, 2016). In other words, the outcome of determining savings recommendations can be performed by many different types of rules and combinations of rules, and this disclosure includes various embodiments with specific rules. While the absence of complete preemption may not guarantee that a claim is eligible, the disclosure does not sufficiently preempt the field of determining savings recommendations at all. The disclosure acts to narrow, confine, and otherwise tie down the disclosure so as not to cover the general abstract idea of just determining savings recommendations. Significantly, other systems and methods exist for determining savings recommendations, so it would be inappropriate to assert that the claimed invention preempts the field or monopolizes the basic tools of determining savings recommendations. In other words, the disclosure will not prevent others from determining savings recommendations, because other systems are already performing the functionality in different ways than the claimed invention. Moreover, the claimed invention includes an inventive concept that may be found in the non-conventional and non-generic arrangement of known, conventional pieces, in conformance with Bascom v. AT&T Mobility, 2015-1763 (Fed. Cir. 2016). The disclosure and claims go way beyond any conventionality of any one of the systems in that the interaction and synergy of the systems leads to additional functionality that is not provided by any one of the systems operating independently. The disclosure and claims may also include the interaction between multiple different systems, so the disclosure cannot be considered an implementation of a generic computer, or just "apply it" to an abstract process. The disclosure and claims may also be directed to improvements to software with a specific implementation of a solution to a problem in the software arts.

In various embodiments, the system and method may include alerting a subscriber (e.g., a user, consumer, etc.) when their computer is offline. The system may include generating customized information and alerting a remote subscriber that the transaction and/or identifier information can be accessed from their computer. The alerts are generated by filtering received information, building information alerts and formatting the alerts into data blocks based upon subscriber preference information. The data blocks are transmitted to the subscriber's web client 120 which, when connected to a computer, causes the computer to auto-launch an application to display the information alert and provide access to more detailed information about the information alert. More particularly, the method may comprise providing a viewer application to a subscriber for installation on a remote subscriber computer and/or web client 120; receiving information at a transmission server sent from a data source over the Internet, the transmission server comprising a microprocessor and a memory that stores the remote subscriber's preferences for information format, destination address, specified information, and transmission schedule, wherein the microprocessor filters the received information by comparing the received information to the specified information; generating an information alert from the filtered information that contains a name, a price and a universal resource locator (URL), which specifies the location of the data source; formatting the information alert into data blocks according to said information format; and transmitting the formatted information alert over a wireless communication channel to web client 120 associated with the consumer based upon the destination address and transmission schedule, wherein the alert activates the application to cause the information alert to display on the remote subscriber computer and/or web client 120 and to enable connection via the URL to the data source over the Internet when web client 120 is locally connected to the remote subscriber computer and the remote subscriber computer comes online.

In various embodiments, the system and method may include a graphical user interface (i.e., comprised in and/or displayed on web client 120) for dynamically relocating/rescaling obscured textual information of an underlying window to become automatically viewable to the user. Such textual information may be comprised in insights analysis system 150 and/or any other interface presented to the consumer or user. By permitting textual information to be dynamically relocated based on an overlap condition, the computer's ability to display information is improved. More particularly, the method for dynamically relocating textual information within an underlying window displayed in a graphical user interface may comprise displaying a first window containing textual information in a first format within a graphical user interface on a computer screen (comprised in web client 120, for example); displaying a second window within the graphical user interface; constantly monitoring the boundaries of the first window and the second window to detect an overlap condition where the second window overlaps the first window such that the textual information in the first window is obscured from a user's view; determining the textual information would not be completely viewable if relocated to an unobstructed portion of the first window; calculating a first measure of the area of the first window and a second measure of the area of the unobstructed portion of the first window; calculating a scaling factor which is proportional to the difference between the first measure and the second measure; scaling the textual information based upon the scaling factor; automatically relocating the scaled textual information, by a processor, to the unobscured portion of the first window in a second format during an overlap condition so that the entire scaled textual information is viewable on the computer screen by the user; and automatically returning the relocated scaled textual information, by the processor, to the first format within the first window when the overlap condition no longer exists.

In various embodiments, the system may also include isolating and removing malicious code from electronic messages (e.g., email, messages within merchant system 130 and/or insights analysis system 150) to prevent a computer, server, and/or system from being compromised, for example by being infected with a computer virus. The system may scan electronic communications for malicious computer code and clean the electronic communication before it may initiate malicious acts. The system operates by physically isolating a received electronic communication in a "quarantine" sector of the computer memory. A quarantine sector is a memory sector created by the computer's operating system such that files stored in that sector are not permitted to act on files outside that sector. When a communication containing malicious code is stored in the quarantine sector, the data contained within the communication is compared to malicious code-indicative patterns stored within a signature database. The presence of a particular malicious code-indicative pattern indicates the nature of the malicious code. The signature database further includes code markers that represent the beginning and end points of the malicious code. The malicious code is then extracted from malicious code-containing communication. An extraction routine is run by a file parsing component of the processing unit. The file parsing routine performs the following operations: scan the communication for the identified beginning malicious code marker; flag each scanned byte between the beginning marker and the successive end malicious code marker; continue scanning until no further beginning malicious code marker is found; and create a new data file by sequentially copying all non-flagged data bytes into the new file, which thus forms a sanitized communication file. The new, sanitized communication is transferred to a non-quarantine sector of the computer memory. Subsequently, all data on the quarantine sector is erased. More particularly, the system includes a method for protecting a computer from an electronic communication containing malicious code by receiving an electronic communication containing malicious code in a computer with a memory having a boot sector, a quarantine sector and a non-quarantine sector; storing the communication in the quarantine sector of the memory of the computer, wherein the quarantine sector is isolated from the boot and the non-quarantine sector in the computer memory, where code in the quarantine sector is prevented from performing write actions on other memory sectors; extracting, via file parsing, the malicious code from the electronic communication to create a sanitized electronic communication, wherein the extracting comprises scanning the communication for an identified beginning malicious code marker, flagging each scanned byte between the beginning marker and a successive end malicious code marker, continuing scanning until no further beginning malicious code marker is found, and creating a new data file by sequentially copying all non-flagged data bytes into a new file that forms a sanitized communication file; transferring the sanitized electronic communication to the non-quarantine sector of the memory; and deleting all data remaining in the quarantine sector.

In various embodiments, the system may also address the problem of retaining control over consumers during affiliate purchase transactions, using a system for co-marketing the "look and feel" of the host web page (e.g., a web page from merchant system 130) with the product-related content information of the advertising merchant's web page. The system can be operated by a third-party outsource provider, who acts as a broker between multiple hosts and merchants. Prior to implementation, a host places links to a merchant's server on the host's web page (e.g., a web page from merchant system 130). The links are associated with product-related content on the merchant's web page. Additionally, the outsource provider system stores the "look and feel" information from each host's web pages in a computer data store, which is coupled to a computer server. The "look and feel" information includes visually perceptible elements such as logos, colors, page layout, navigation system, frames, mouse-over effects or other elements that are consistent through some or all of each host's respective web pages. A consumer who clicks on an advertising link is not transported from the host web page to the merchant's web page, but instead is re-directed to a composite web page that combines product information associated with the selected item and visually perceptible elements of the host web page. The outsource provider's server responds by first identifying the host web page where the link has been selected and retrieving the corresponding stored "look and feel" information. The server constructs a composite web page using the retrieved "look and feel" information of the host web page, with the product-related content embedded within it, so that the composite web page is visually perceived by the consumer as associated with the host web page. The server then transmits and presents this composite web page to the consumer so that she effectively remains on the host web page to purchase the item without being redirected to the third party merchant affiliate. Because such composite pages are visually perceived by the consumer as associated with the host web page, they give the consumer the impression that she is viewing pages served by the host. Further, the consumer is able to purchase the item without being redirected to the third party merchant affiliate, thus allowing the host to retain control over the consumer. This system enables the host to receive the same advertising revenue streams as before but without the loss of visitor traffic and potential customers. More particularly, the system may be useful in an outsource provider serving web pages offering commercial opportunities. The computer store containing data, for each of a plurality of first web pages, defining a plurality of visually perceptible elements, which visually perceptible elements correspond to the plurality of first web pages; wherein each of the first web pages belongs to one of a plurality of web page owners; wherein each of the first web pages displays at least one active link associated with a commerce object associated with a buying opportunity of a selected one of a plurality of merchants; and wherein the selected merchant, the outsource provider, and the owner of the first web page displaying the associated link are each third parties with respect to one other; a computer server at the outsource provider, which computer server is coupled to the computer store and programmed to: receive from the web browser of a computer user a signal indicating activation of one of the links displayed by one of the first web pages; automatically identify as the source page the one of the first web pages on which the link has been activated; in response to identification of the source page, automatically retrieve the stored data corresponding to the source page; and using the data retrieved, automatically generate and transmit to the web browser a second web page that displays: information associated with the commerce object associated with the link that has been activated, and the plurality of visually perceptible elements visually corresponding to the source page.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "satisfy," "meet," "match," "associated with" or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship and/or the like.

Terms and phrases similar to "associate" and/or "associating" may include tagging, flagging, correlating, using a look-up table or any other method or system for indicating or creating a relationship between elements, such as, for example, (i) a spending type, (ii) parameter, and/or (iii) parameter value. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input and/or any other method known in the art.

The system or any components may integrate with system integration technology such as, for example, the ALEXA system developed by AMAZON. Alexa is a cloud-based voice service that can help you with tasks, entertainment, general information and more. All Amazon Alexa devices, such as the Amazon Echo, Amazon Dot, Amazon Tap and Amazon Fire TV, have access to the Alexa Voice Service. The system may receive voice commands via its voice activation technology, and activate other functions, control smart devices and/or gather information. For example, music, emails, texts, calling, questions answered, home improvement information, smart home communication/activation, games, shopping, making to-do lists, setting alarms, streaming podcasts, playing audiobooks, and providing weather, traffic, and other real time information, such as news. The system may allow the user to access information about eligible accounts linked to an online account across all Alexa-enabled devices.

The phrases consumer, customer, user, account holder, account affiliate, cardmember or the like shall include any person, entity, business, government organization, business, software, hardware, machine associated with a transaction account, who buys merchant offerings offered by one or more merchants using the account and/or who is legally designated for performing transactions on the account, regardless of whether a physical card is associated with the account. For example, the cardmember may include a transaction account owner, a transaction account user, an account affiliate, a child account user, a subsidiary account user, a beneficiary of an account, a custodian of an account, and/or any other person or entity affiliated or associated with a transaction account.

As used herein, big data may refer to partially or fully structured, semi-structured, or unstructured data sets including millions of rows and hundreds of thousands of columns. A big data set may be compiled, for example, from a history of purchase transactions over time, from web registrations, from social media, from records of charge (ROC), from summaries of charges (SOC), from internal data, or from other suitable sources. Big data sets may be compiled without descriptive metadata such as column types, counts, percentiles, or other interpretive-aid data points.

A record of charge (or "ROC") may comprise any transaction or transaction information/details. The ROC may be a unique identifier associated with a transaction. Record of Charge (ROC) data includes important information and enhanced data. For example, a ROC may contain details such as location, merchant name or identifier, transaction amount, transaction date, account number, account security pin or code, account expiry date, and the like for the transaction. Such enhanced data increases the accuracy of matching the transaction data to the receipt data. Such enhanced ROC data is NOT equivalent to transaction entries from a banking statement or transaction account statement, which is very limited to basic data about a transaction. Furthermore, a ROC is provided by a different source, namely the ROC is provided by the merchant to the transaction processor. In that regard, the ROC is a unique identifier associated with a particular transaction. A ROC is often associated with a Summary of Charges (SOC). The ROCs and SOCs include information provided by the merchant to the transaction processor, and the ROCs and SOCs are used in the settlement process with the merchant. A transaction may, in various embodiments, be performed by a one or more members using a transaction account, such as a transaction account associated with a gift card, a debit card, a credit card, and the like.

Distributed computing cluster may be, for example, a Hadoop® cluster configured to process and store big data sets with some of nodes comprising a distributed storage system and some of nodes comprising a distributed processing system. In that regard, distributed computing cluster may be configured to support a Hadoop® distributed file system (HDFS) as specified by the Apache Software Foundation at http://hadoop.apache.org/docs/. For more information on big data management systems, see U.S. Ser. No. 14/944,902 titled INTEGRATED BIG DATA INTERFACE FOR MULTIPLE STORAGE TYPES and filed on Nov. 18, 2015; U.S. Ser. No. 14/944,979 titled SYSTEM AND METHOD FOR READING AND WRITING TO BIG DATA STORAGE FORMATS and filed on Nov. 18, 2015; U.S. Ser. No. 14/945,032 titled SYSTEM AND METHOD FOR CREATING, TRACKING, AND MAINTAINING BIG DATA USE CASES and filed on Nov. 18, 2015; U.S. Ser. No. 14/944,849 titled SYSTEM AND METHOD FOR AUTOMATICALLY CAPTURING AND RECORDING LINEAGE DATA FOR BIG DATA RECORDS and filed on Nov. 18, 2015; U.S. Ser. No. 14/944,898 titled SYSTEMS AND METHODS FOR TRACKING SENSITIVE DATA IN A BIG DATA ENVIRONMENT and filed on Nov. 18, 2015; and U.S. Ser. No. 14/944,961 titled SYSTEM AND METHOD TRANSFORMING SOURCE DATA INTO OUTPUT DATA IN BIG DATA ENVIRONMENTS and filed on Nov. 18, 2015, the contents of each of which are herein incorporated by reference in their entirety.

Any communication, transmission and/or channel discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website or device (e.g., Facebook, YOUTUBE®, APPLE®TV®, PANDORA®, XBOX®, SONY® PLAYSTATION®), a uniform resource locator ("URL"), a document (e.g., a MICROSOFT® Word® document, a MICROSOFT® Excel® document, an ADOBE® .pdf document, etc.), an "ebook," an "emagazine," an application or microapplication (as described herein), an SMS or other type of text message, an email, facebook, twitter, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, MYSPACE®, LINKEDIN®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

A "consumer profile" or "consumer profile data" may comprise any information or data about a consumer that describes an attribute associated with the consumer (e.g., a preference, an interest, demographic information, personally identifying information, and the like).

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, OS2, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations or any of the operations may be conducted or enhanced by Artificial Intelligence (AI) or Machine Learning. Useful machines for performing the various embodiments include general purpose digital computers or similar devices.

In various embodiments, the server may include application servers (e.g. WEB SPHERE, WEB LOGIC, JBOSS, EDB® Postgres Plus Advanced Server® (PPAS), etc.). In various embodiments, the server may include web servers (e.g. APACHE, IIS, GWS, SUN JAVA® SYSTEM WEB SERVER, JAVA Virtual Machine running on LINUX or WINDOWS).

Practitioners will appreciate that web client 120 may or may not be in direct contact with an application server. For example, web client 120 may access the services of an application server through another server and/or hardware component, which may have a direct or indirect connection to an Internet server. For example, web client 120 may communicate with an application server via a load balancer. In various embodiments, access is through a network or the Internet through a commercially-available web-browser software package.

As those skilled in the art will appreciate, web client 120 may include an operating system (e.g., WINDOWS®/CE/Mobile, OS2, UNIX®, LINUX®, SOLARIS®, MacOS, etc.) as well as various conventional support software and drivers typically associated with computers. Web client 120 may include any suitable personal computer, network computer, workstation, personal digital assistant, cellular phone, smart phone, minicomputer, mainframe or the like. Web client 120 can be in a home or business environment with access to a network. In various embodiments, access is through a network or the Internet through a commercially available web-browser software package. Web client 120 may implement security protocols such as Secure Sockets Layer (SSL) and Transport Layer Security (TLS). Web client 120 may implement several application layer protocols including http, https, ftp, and sftp.

In various embodiments, components, modules, and/or engines of system 100 may be implemented as microapplications or micro-apps. Micro-apps are typically deployed in the context of a mobile operating system, including for example, a WINDOWS® mobile operating system, an ANDROID® Operating System, APPLE® IOS®, a BLACKBERRY® operating system and the like.

The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein an "identifier" may be any suitable identifier that uniquely identifies an item. For example, the identifier may be a globally unique identifier ("GUID"). The GUID may be an identifier created and/or implemented under the universally unique identifier standard. Moreover, the GUID may be stored as 128-bit value that can be displayed as 32 hexadecimal digits. The identifier may also include a major number, and a minor number. The major number and minor number may each be 16 bit integers.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., IPHONE®, BLACK-BERRY®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, APPLE®talk, IP-6, NetBIOS®, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA® 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/publications/nistpubs/800-145/SP800-145.pdf (last visited June 2012), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

Phrases and terms similar to an "item" may include any good, service, information, experience, entertainment, data, offer, discount, rebate, points, virtual currency, content, access, rental, lease, contribution, account, credit, debit, benefit, right, reward, points, coupons, credits, monetary equivalent, anything of value, something of minimal or no value, monetary value, non-monetary value and/or the like. Moreover, the "transactions" or "purchases" discussed herein may be associated with an item. Furthermore, a "reward" may be an item.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, blockchain, object-oriented structure and/or any other database configurations. Common database products that may be used to implement the databases include DB2 by IBM® (Armonk, NY), various database products available from ORACLE® Corporation (Redwood Shores, CA), MICROSOFT® Access® or MICROSOFT® SQL Server® by MICROSOFT® Corporation (Redmond, Washington), MySQL by MySQL AB (Uppsala, Sweden), MongoDB®, Redis®, Apache Cassandra®, HBase by APACHE®, MapR-DB, or any other suitable database product. Moreover, the databases may be organized in any suitable manner, for example, as data tables or lookup tables. Each record may be a single file, a series of files, a linked series of data fields or any other data structure.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the system, by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header," "header," "trailer," or "status," herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a standalone interaction device configured to add, delete, modify, or augment the data in accordance with the header or trailer. As such, in one embodiment, the header or trailer is not stored on the transaction device along with the associated issuer-owned data but instead the appropriate action may be taken by providing to the user at the standalone device, the appropriate option for the action to be taken. The system may contemplate a data storage arrangement wherein the header or trailer, or header or trailer history, of the data is stored on the system, device or transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, GPG (GnuPG), HPE Format-Preserving Encryption (FPE), Voltage, and symmetric and asymmetric cryptosystems. The systems and methods may also incorporate SHA series cryptographic methods as well as ECC (Elliptic Curve Cryptography) and other Quantum Readable Cryptography Algorithms under development.

The computing unit of web client 120 may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

Firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within a web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In one embodiment, the MICROSOFT® INTERNET INFORMATION SERVICES® (IIS), MICROSOFT® Transaction Server (MTS), and MICROSOFT® SQL Server, are used in conjunction with the MICROSOFT® operating system, MICROSOFT® NT web server software, a MICROSOFT® SQL Server database system, and a MICROSOFT® Commerce Server. Additionally, components such as Access or MICROSOFT® SQL Server, ORACLE®, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, Ruby, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT, active server pages (ASP), common gateway interface scripts (CGI), extensible markup language (XML), dynamic HTML, cascading style sheets (CSS), AJAX (Asynchronous JAVASCRIPT And XML), helper applications, plug-ins, and the like. A server may include a web service that receives a request from a web server, the request including a URL and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference. For example, representational state transfer (REST), or RESTful, web services may provide one way of enabling interoperability between applications.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WEBSPHERE MQ™ (formerly MQSeries) by IBM®, Inc. (Armonk, NY) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C #, JAVA®, JAVASCRIPT, JAVASCRIPT Object Notation (JSON), VBScript, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "JAVA® Cryptography" by Jonathan Knudson, published by O'Reilly & Associates (1998); (3) "Cryptography & Network Security: Principles & Practice" by William Stallings, published by Prentice Hall; all of which are hereby incorporated by reference.

In various embodiments, the software elements of the system may also be implemented using Node.js®. Node.js® may implement several modules to handle various core functionalities. For example, a package management module, such as npm®, may be implemented as an open source library to aid in organizing the installation and management of third-party Node.js® programs. Node.js® may also implement a process manager, such as, for example, Parallel Multithreaded Machine ("PM2"); a resource and performance monitoring tool, such as, for example, Node Application Metrics ("appmetrics"); a library module for building user interfaces, such as for example ReachJS®; and/or any other suitable and/or desired module.

As used herein, the term "end user," "consumer," "customer," "cardmember," "business" or "merchant" may be used interchangeably with each other, and each shall mean any person, entity, government organization, business, machine, hardware, and/or software. A bank may be part of the system, but the bank may represent other types of card issuing institutions, such as credit card companies, card sponsoring companies, or third party issuers under contract with financial institutions. It is further noted that other participants may be involved in some phases of the transaction, such as an intermediary settlement institution, but these participants are not shown.

Each participant is equipped with a computing device in order to interact with the system and facilitate online commerce transactions. The customer has a computing unit in the form of a personal computer, although other types of computing units may be used including laptops, notebooks, hand held computers, set-top boxes, cellular telephones, touch-tone telephones and the like. The merchant has a computing unit implemented in the form of a computer-server, although other implementations are contemplated by the system. The bank has a computing center shown as a main frame computer. However, the bank computing center may be implemented in other forms, such as a mini-computer, a PC server, a network of computers located in the same of different geographic locations, or the like. Moreover, the system contemplates the use, sale or distribution of any goods, services or information over any network having similar functionality described herein.

The merchant computer and the bank computer may be interconnected via a second network, referred to as a payment network. The payment network which may be part of certain transactions represents existing proprietary networks that presently accommodate transactions for credit cards, debit cards, and other types of financial/banking cards. The payment network is a closed network that is assumed to be secure from eavesdroppers. Exemplary transaction networks may include the American Express®, VisaNet®, Veriphone®, Discover Card®, PayPal®, ApplePay®, GooglePay®, private networks (e.g., department store networks), and/or any other payment networks.

The electronic commerce system may be implemented at the customer and issuing bank. In an exemplary implementation, the electronic commerce system is implemented as computer software modules loaded onto the customer computer and the banking computing center. The merchant computer does not require any additional software to participate in the online commerce transactions supported by the online commerce system.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS®, webpages, websites, web forms, prompts, etc. Practitioners will appreciate that the illustrated steps described herein may comprise in any number of configurations including the use of WINDOWS®, webpages, web forms, popup WINDOWS®, prompts and the like. It should be further appreciated that the multiple steps as illustrated and described may be combined into single webpages and/or WINDOWS® but have been expanded for the sake of simplicity. In other cases, steps illustrated and described as single process steps may be separated into multiple webpages and/or WINDOWS® but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in *In Re Nuijten* to fall outside the scope of patentable subject matter under 35 U.S.C. § 101.

In yet another embodiment, the transponder, transponder-reader, and/or transponder-reader system are configured with a biometric security system that may be used for providing biometrics as a secondary form of identification. The biometric security system may include a transponder and a reader communicating with the system. The biometric security system also may include a biometric sensor that detects biometric samples and a device for verifying biometric samples. The biometric security system may be configured with one or more biometric scanners, processors and/or systems. A biometric system may include one or more technologies, or any portion thereof, such as, for example, recognition of a biometric. As used herein, a biometric may include a user's voice, fingerprint, facial, ear, signature, vascular patterns, DNA sampling, hand geometry, sound, olfactory, keystroke/typing, iris, retinal or any other biometric relating to recognition based upon any body part, function, system, attribute and/or other characteristic, or any portion thereof.

Phrases and terms similar to a "party" may include any individual, consumer, customer, group, business, organization, government entity, transaction account issuer or processor (e.g., credit, charge, etc), merchant, consortium of merchants, account holder, charitable organization, software, hardware, and/or any other type of entity. The terms "user," "consumer," "purchaser," and/or the plural form of these terms are used interchangeably throughout herein to refer to those persons or entities that are alleged to be authorized to use a transaction account.

Phrases and terms similar to "account" "account number," "account code" or "consumer account" as used herein, may include any device, code (e.g., one or more of an authorization/access code, personal identification number ("PIN"), Internet code, other identification code, and/or the like), number, letter, symbol, digital certificate, smart chip, digital signal, analog signal, biometric or other identifier/indicia suitably configured to allow the consumer to access, interact with or communicate with the system. The account number may optionally be located on or associated with a rewards account, charge account, credit account, debit account, prepaid account, telephone card, embossed card, smart card, magnetic stripe card, bar code card, transponder, radio frequency card or an associated account.

The system may include or interface with any of the foregoing accounts, devices, and/or a transponder and reader (e.g. RFID reader) in RF communication with the transponder (which may include a fob), or communications between an initiator and a target enabled by near field communications (NFC). Typical devices may include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit. Examples may include watches, Internet enabled kitchen appliances, restaurant tables embedded with RF readers, wallets or purses with imbedded transponders, etc. Furthermore, a device or financial transaction instrument may have electronic and communications functionality enabled, for example, by: a network of electronic circuitry that is printed or otherwise incorporated onto or within the transaction instrument (and typically referred to as a "smart card"); a fob having a transponder and an RFID reader; and/or near field communication (NFC) technologies. For more information regarding NFC, refer to the following specifications all of which are incorporated by reference herein: ISO/IEC 18092/ECMA-340, Near Field Communication Interface and Protocol-1 (NFCIP-1); ISO/IEC 21481/ECMA-352, Near Field Communication Interface and Protocol-2 (NFCIP-2); and EMV 4.2 available at http://www.emvco.com/default.aspx.

The account number may be distributed and stored in any form of plastic, electronic, magnetic, radio frequency, wireless, audio and/or optical device capable of transmitting or downloading data from itself to a second device. A consumer account number may be, for example, a sixteen-digit account number, although each credit provider has its own numbering system, such as the fifteen-digit numbering system used by American Express. Each company's account numbers comply with that company's standardized format such that the company using a fifteen-digit format will generally use three-spaced sets of numbers, as represented by the number "0000 000000 00000." The first five to seven digits are reserved for processing purposes and identify the issuing bank, account type, etc. In this example, the last (fifteenth) digit is used as a sum check for the fifteen digit number. The intermediary eight-to-eleven digits are used to uniquely identify the consumer. A merchant account number may be, for example, any number or alpha-numeric characters that identify a particular merchant for purposes of account acceptance, account reconciliation, reporting, or the like.

In various embodiments, an account number may identify a consumer. In addition, in various embodiments, a consumer may be identified by a variety of identifiers, including, for example, an email address, a telephone number, a cookie id, a radio frequency identifier (RFID), a biometric, and the like.

Phrases and terms similar to "financial institution" or "transaction account issuer" may include any entity that offers transaction account services. Although often referred to as a "financial institution," the financial institution may represent any type of bank, lender or other type of account issuing institution, such as credit card companies, card sponsoring companies, or third party issuers under contract with financial institutions. It is further noted that other participants may be involved in some phases of the transaction, such as an intermediary settlement institution.

Phrases and terms similar to "business" or "merchant" may be used interchangeably with each other and shall mean any person, entity, distributor system, software and/or hardware that is a provider, broker and/or any other entity in the distribution chain of goods or services. For example, a merchant may be a grocery store, a retail store, a travel agency, a service provider, an on-line merchant or the like.

The terms "payment vehicle," "transaction account," "financial transaction instrument," "transaction instrument" and/or the plural form of these terms may be used interchangeably throughout to refer to a financial instrument. Phrases and terms similar to "transaction account" may include any account that may be used to facilitate a financial transaction.

Phrases and terms similar to "merchant," "supplier" or "seller" may include any entity that receives payment or other consideration. For example, a supplier may request payment for goods sold to a buyer who holds an account with a transaction account issuer.

Phrases and terms similar to a "buyer" may include any entity that receives goods or services in exchange for consideration (e.g. financial payment). For example, a buyer may purchase, lease, rent, barter or otherwise obtain goods from a supplier and pay the supplier using a transaction account.

Phrases and terms similar to "internal data" may include any data a credit issuer possesses or acquires pertaining to a particular consumer. Internal data may be gathered before, during, or after a relationship between the credit issuer and the transaction account holder (e.g., the consumer or buyer). Such data may include consumer demographic data. Consumer demographic data includes any data pertaining to a consumer. Consumer demographic data may include consumer name, address, telephone number, email address, employer and social security number. Consumer transactional data is any data pertaining to the particular transactions in which a consumer engages during any given time period. Consumer transactional data may include, for example, transaction amount, transaction time, transaction vendor/merchant, and transaction vendor/merchant location. Transaction vendor/merchant location may contain a high degree of specificity to a vendor/merchant. For example, transaction vendor/merchant location may include a particular gasoline filing station in a particular postal code located at a particular cross section or address. Also, for example, transaction vendor/merchant location may include a particular web address, such as a Uniform Resource Locator ("URL"), an email address and/or an Internet Protocol ("IP") address for a vendor/merchant. Transaction vendor/merchant, and transaction vendor/merchant location may be associated with a particular consumer and further associated with sets of consumers. Consumer payment data includes any data pertaining to a consumer's history of paying debt obligations. Consumer payment data may include consumer payment dates, payment amounts, balance amount, and credit limit. Internal data may further comprise records of consumer service calls, complaints, requests for credit line increases, questions, and comments. A record of a consumer service call includes, for example, date of call, reason for call, and any transcript or summary of the actual call.

Phrases similar to a "payment processor" may include a company (e.g., a third party) appointed (e.g., by a merchant) to handle transactions. A payment processor may include an issuer, acquirer, authorizer and/or any other system or entity involved in the transaction process. Payment processors may be broken down into two types: front-end and back-end. Front-end payment processors have connections to various transaction accounts and supply authorization and settlement services to the merchant banks' merchants. Back-end payment processors accept settlements from front-end payment processors and, via The Federal Reserve Bank, move money from an issuing bank to the merchant bank. In an operation that will usually take a few seconds, the payment processor will both check the details received by forwarding the details to the respective account's issuing bank or card association for verification, and may carry out a series of anti-fraud measures against the transaction. Additional parameters, including the account's country of issue and its previous payment history, may be used to gauge the probability of the transaction being approved. In response to the payment processor receiving confirmation that the transaction account details have been verified, the information may be relayed back to the merchant, who will then complete the payment transaction. In response to the verification being denied, the payment processor relays the information to the merchant, who may then decline the transaction.

Phrases similar to a "payment gateway" or "gateway" may include an application service provider service that authorizes payments for e-businesses, online retailers, and/ or traditional brick and mortar merchants. The gateway may be the equivalent of a physical point of sale terminal located in most retail outlets. A payment gateway may protect transaction account details by encrypting sensitive information, such as transaction account numbers, to ensure that information passes securely between the customer and the merchant and also between merchant and payment processor.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Therefore, the following is claimed:

1. A method, comprising:
   receiving, by at least one computing device, a plurality of transactions for an organization, the plurality of transactions comprising metadata that includes transaction information;
   determining, by the at least one computing device, a first subset of the plurality of transactions between a first day and a last day of a trip at a first location that is different from a home location of a consumer;
   determining, by the at least one computing device, a merchant has a merchant billing location independent of each transaction location;
   identifying, by the at least one computing device, a respective transaction associated with a second location that occurred between the first day and the last day;
   assigning, by the at least one computing device, the respective transaction to the first subset of the plurality of transactions for the trip based at least in part on the respective transaction being associated with the merchant and the second location matching the merchant billing location, the merchant billing location of the merchant being different from the first location associated with the first subset of the plurality of transactions;
   determining, by the at least one computing device, a second subset of the plurality of transactions of a spending type based at least in part on the metadata associated with the first subset of the plurality of transactions;
   identifying, by the at least one computing device, a parameter value associated with the spending type from the second subset of the plurality of transactions;
   determining, by the at least one computing device, a parameter adjustment recommendation based at least in part on a comparison between the parameter value and a parameter benchmark, the parameter adjustment recommendation being an adjustment amount of the parameter value which is configured to cause a decrease in a difference between the parameter value and the parameter benchmark;
   causing, by the at least one computing device, a display of a spending type user interface on a client device, the spending type user interface comprising the parameter adjustment recommendation and a parameter component for the parameter value;
   receiving, by the at least one computing device, a selection of the parameter component;
   determining, by the at least one computing device, a set of parameter values and a set of costs for the set of parameter values in response to the selection of the parameter component, the set of parameter values representing a plurality of levels with respect to the parameter value, the set of costs being based at least in part on a plurality of similar transactions; and
   causing, by the at least one computing device, a display of a parameter user interface on the client device, the parameter user interface comprising the set of parameter values and the set of costs for the set of parameter values.

2. The method of claim 1, further comprising:
   determining, by the at least one computing device, a first transaction cost associated with a first transaction;
   comparing, by the at least one computing device, the first transaction cost with a first spending type benchmark cost; and
   calculating, by the at least one computing device, a first cost difference between the first transaction cost and the first spending type benchmark cost, wherein the parameter adjustment recommendation is configured to decrease the first cost difference in response to the first cost difference being an unfavorable difference.

3. The method of claim 2, wherein determining the first transaction cost comprises determining a first total cost amount and dividing it by a base unit amount such that the first transaction cost is a first monetary amount per base unit, and wherein the first spending type benchmark cost is a benchmark monetary amount per base unit.

4. The method of claim 2, further comprising:
   comparing, by the at least one computing device, the parameter value to the parameter benchmark to determine a first parameter value difference;

calculating, by the at least one computing device, a first portion of the first cost difference attributed to the first parameter value difference; and determining, by the at least one computing device, a first savings amount associated with implementation of the parameter adjustment recommendation.

5. The method of claim 1, further comprising:

determining, by the at least one computing device, a cost saving value associated with an implementation of the parameter adjustment recommendation; and causing, by the at least one computing device, a display of the cost saving value and the parameter adjustment recommendation in the spending type user interface.

6. The method of claim 1, wherein the spending type of the second subset of the plurality of transactions is determined based at least in part on a time stamp.

7. The method of claim 1, wherein the first day of the trip is determined by identifying a geographic location change in the transaction information associated with a pair of consecutive transactions in the plurality of transactions, wherein the pair of consecutive transactions comprises a respective pair of geographic locations having a distance between the respective pair of geographic locations of greater than a predetermined travel distance.

8. A system, comprising:

a computing device comprising a processor and memory; and machine executable instructions stored in memory that, when executed by the processor, cause the processor to perform operations comprising:

receiving a plurality of transactions for an organization, the plurality of transactions comprising metadata that includes transaction information;

determining a first subset of the plurality of transactions between a first day and a last day of a trip at a first location that is different from a home location of a consumer;

determining a merchant has a merchant billing location independent of each transaction location;

identifying a respective transaction associated with a second location that occurred between the first day and the last day;

assigning the respective transaction to the first subset of the plurality of transactions for the trip based at least in part on the respective transaction being associated with the merchant and the second location matching the merchant billing location;

determining a second subset of the plurality of transactions of a spending type based at least in part on the metadata associated with the first subset of the plurality of transactions;

identifying a parameter value associated with the spending type from the second subset of the plurality of transactions;

determining a parameter adjustment recommendation based at least in part on a comparison between the parameter value and a parameter benchmark, the parameter adjustment recommendation being an adjustment amount of the parameter value which is configured to cause a decrease in a difference between the parameter value and the parameter benchmark;

causing a display of a spending type user interface on a client device, the spending type user interface comprising the parameter adjustment recommendation and a parameter component for the parameter value;

receiving a selection of the parameter component;

determining a set of parameter values and a set of costs for the set of parameter values in response to the selection of the parameter component, the set of parameter values representing a plurality of levels with respect to the parameter value, the set of costs being based at least in part on a plurality of similar transactions; and causing a display of a parameter user interface on the client device, the parameter user interface comprising the set of parameter values and the set of costs for the set of parameter values.

9. The system of claim 8, wherein the machine executable instructions, when executed, further cause the processor to perform the operations comprising:

determining a first transaction cost associated with a first transaction;

comparing the first transaction cost with a first spending type benchmark cost; and calculating a first cost difference between the first transaction cost and the first spending type benchmark cost, wherein the parameter adjustment recommendation is configured to decrease the first cost difference in response to the first cost difference being an unfavorable difference.

10. The system of claim 9, wherein determining the first transaction cost comprises determining a first total cost amount and dividing it by a base unit amount such that the first transaction cost is a first monetary amount per base unit, and wherein the first spending type benchmark cost is a benchmark monetary amount per base unit.

11. The system of claim 9, wherein the machine executable instructions, when executed, further cause the processor to perform the operations comprising:

comparing the parameter value to the parameter benchmark to determine a first parameter value difference;

calculating a first portion of the first cost difference attributed to the first parameter value difference; and determining a first savings amount associated with implementation of the parameter adjustment recommendation.

12. The system of claim 8, wherein the machine executable instructions, when executed, further cause the processor to perform the operations comprising:

determining a cost saving value associated with an implementation of the parameter adjustment recommendation; and causing a display of the cost saving value and the parameter adjustment recommendation in the spending type user interface.

13. The system of claim 8, wherein the spending type of the second subset of the plurality of transactions is determined based at least in part on a time stamp.

14. The system of claim 8, wherein the first day of the trip is determined by identifying a geographic location change in the transaction information associated with a pair of consecutive transactions in the plurality of transactions, wherein the pair of consecutive transactions comprises a respective pair of geographic locations having a distance between the respective pair of geographic locations of greater than a predetermined travel distance.

15. An article of manufacture including a non-transitory, tangible computer readable memory having instructions stored thereon that, in response to execution by at least one computing device, cause the at least one computing device to perform operations comprising:

receiving a plurality of transactions for an organization, the plurality of transactions comprising metadata that includes transaction information;

determining a first subset of the plurality of transactions between a first day and a last day of a trip at a first location that is different from a home location of a consumer;

determining a merchant has a merchant billing location independent of each transaction location;

identifying a respective transaction associated with a second location that occurred between the first day and the last day;

assigning the respective transaction to the first subset of the plurality of transactions for the trip based at least in part on the respective transaction being associated with the merchant and the second location matching the merchant billing location;

determining a second subset of the plurality of transactions of a spending type based at least in part on the metadata associated with the first subset of the plurality of transactions;

identifying a parameter value associated with the spending type from the second subset of the plurality of transactions;

determining a parameter adjustment recommendation based at least in part on a comparison between the parameter value and a parameter benchmark, the parameter adjustment recommendation being an adjustment amount of the parameter value which is configured to cause a decrease in a difference between the parameter value and the parameter benchmark;

causing a display of a spending type user interface on a client device, the spending type user interface comprising the parameter adjustment recommendation and a parameter component for the parameter value;

receiving a selection of the parameter component;

determining a set of parameter values and a set of costs for the set of parameter values in response to the selection of the parameter component, the set of parameter values representing a plurality of levels with respect to the parameter value, the set of costs being based at least in part on a plurality of similar transactions; and causing a display of a parameter user interface on the client device, the parameter user interface comprising the set of parameter values and the set of costs for the set of parameter values.

16. The article of manufacture of claim 15, wherein, when executed, the instructions cause the at least one computing device to further perform the operations comprising:

determining a first transaction cost associated with a first transaction;

comparing the first transaction cost with a first spending type benchmark cost; and calculating a first cost difference between the first transaction cost and the first spending type benchmark cost, wherein the parameter adjustment recommendation is configured to decrease the first cost difference in response to the first cost difference being an unfavorable difference.

17. The article of manufacture of claim 16, wherein determining the first transaction cost comprises determining a first total cost amount and dividing it by a base unit amount such that the first transaction cost is a first monetary amount per base unit, and wherein the first spending type benchmark cost is a benchmark monetary amount per base unit.

18. The article of manufacture of claim 15, wherein, when executed, the instructions cause the at least one computing device to further perform the operations comprising:

determining a cost saving value associated with an implementation of the parameter adjustment recommendation; and causing a display of the cost saving value and the parameter adjustment recommendation in the spending type user interface.

19. The article of manufacture of claim 15, wherein the spending type of the second subset of the plurality of transactions is determined based at least in part on a time stamp.

20. The article of manufacture of claim 15, wherein the first day of the trip is determined by identifying a geographic location change in the transaction information associated with a pair of consecutive transactions in the plurality of transactions, wherein the pair of consecutive transactions comprises a respective pair of geographic locations having a distance between the respective pair of geographic locations of greater than a predetermined travel distance.

* * * * *